United States Patent
Shwartz et al.

(10) Patent No.: US 12,474,283 B2
(45) Date of Patent: Nov. 18, 2025

(54) SYSTEM AND METHOD FOR MAPPING CHEMICAL ELEMENTS IN A SAMPLE

(71) Applicant: BAR ILAN UNIVERSITY, Ramat Gan (IL)

(72) Inventors: Sharon Shwartz, Kiryat Ono (IL); Yishay Klein, Amatzia (IL)

(73) Assignee: BAR ILAN UNIVERSITY, Ramat Gan (IL)

( * ) Notice: Subject to any disclaimer, the term of this patent is extended or adjusted under 35 U.S.C. 154(b) by 255 days.

(21) Appl. No.: 18/037,768

(22) PCT Filed: Nov. 21, 2021

(86) PCT No.: PCT/IL2021/051385
§ 371 (c)(1),
(2) Date: May 18, 2023

(87) PCT Pub. No.: WO2022/107148
PCT Pub. Date: May 27, 2022

(65) Prior Publication Data
US 2024/0003837 A1      Jan. 4, 2024

Related U.S. Application Data

(60) Provisional application No. 63/116,834, filed on Nov. 21, 2020.

(51) Int. Cl.
    *G01N 23/223*      (2006.01)
(52) U.S. Cl.
    CPC ..... *G01N 23/223* (2013.01); *G01N 2223/076* (2013.01); *G01N 2223/402* (2013.01)
(58) Field of Classification Search
    CPC ........... G01N 23/223; G01N 2223/076; G01N 2223/402
    See application file for complete search history.

(56) References Cited

U.S. PATENT DOCUMENTS 10,107,768 B2  10/2018  Brady et al.
2008/0095298 A1  4/2008  Shefsky
(Continued)

FOREIGN PATENT DOCUMENTS

CN    111474145 A    7/2020
GB      2566115 A    3/2019

OTHER PUBLICATIONS

Jeffrey H. Shapiro, "Computational ghost imaging," Phys. Rev. A, 78, pp. 1-4 (Dec. 2008).
(Continued)

*Primary Examiner* — Chih-Cheng Kao
(74) *Attorney, Agent, or Firm* — Whitestone Law, PLLC

(57) ABSTRACT

Measurement system and method are presented for determining spatial distribution of chemical elements in a sample. The system comprises a measurement unit and a control system. The measurement unit is adapted to produce primary radiation having spectral characteristic adapted to excite a number M of chemical elements in the sample to induce secondary radiation responses, and generate spectral measured data indicative of intensity of detected responses. The primary radiation interacting with the sample includes a sequence of two or more encoded radiation patterns of the primary radiation, each having its predetermined spatial intensity pattern. The measured spectral data includes a sequence of data pieces, each being modulated by the respective one of the two or more predetermined spatial intensity patterns of the encoded primary radiation and characterized by sparsity in spectral domain with respect to each spectral component of the secondary radiation response.

18 Claims, 11 Drawing Sheets

(56) References Cited

U.S. PATENT DOCUMENTS

| | | | |
|---|---|---|---|
| 2014/0072095 A1 | 3/2014 | Feser et al. | |
| 2019/0193119 A1* | 6/2019 | Grof | B07C 5/3412 |
| 2021/0048399 A1* | 2/2021 | Grof | G01N 23/223 |

OTHER PUBLICATIONS

Ori Katz, et al., "Compressive ghost imaging," Appl. Phys. Lett., vol. 95, Issue 13, pp. 1-3 (Sep. 2009).

Nian Tian, et al., "Fluorescence ghost imaging with pseudothermal light," Optics Letters, vol. 36, Issue 16, pp. 3302-3304 (Aug. 15, 2011).

Vincent Studer, et al., "Compressive fluorescence microscopy for biological and hyperspectral imaging," Proc. Natl. Acad. Sci., vol. 109, Issue 26, pp. E1679-E1687 (Jun. 11, 2012).

Mehrdad Tanha, et al., "Computational fluorescence ghost imaging," Eur. Phys. J. D, vol. 67, Issue 44, pp. 1-4 (Mar. 7, 2013).

Chengbo Li, et al., "An Efficient Augmented Lagrangian Method with Applications to Total Variation Minimization," Computational Optimization and Applications, vol. 56, pp. 507-530 (Jul. 3, 2013).

A. Haboub, et al., "Coded aperture imaging for fluorescent x-rays," Rev Sci Instrum, vol. 85, Issue 6, pp. 1-8 (Jun. 2014).

Kouichi Tsuji, et al., "New developments of X-ray fluorescence imaging techniques in laboratory," Spectrochimica Acta Part B, vol. 113, pp. 43-53 (Nov. 2015).

Yasuhiro Mizutani, et al., "Fluorescence microscope by using computational ghost imaging," MATEC Web of Conferences, vol. 32, pp. 1-4 (Dec. 2, 2015).

Daniele Pelliccia, et al., "Experimental X-Ray Ghost Imaging," Phys. Rev. Lett., vol. 117, pp. 1-5 (Sep. 7, 2016).

Hong Yu, et al., "Fourier-Transform Ghost Imaging with Hard X Rays," Phys. Rev. Lett., vol. 117, (Sep. 7, 2016).

Guang Chen, et al., "Confocal depth-resolved fluorescence micro-X-ray absorption spectroscopy for the study of cultural heritage materials: a new mobile endstation at the Beijing Synchrotron Radiation Facility," J. Synchrotron Radiat, vol. 24, pp. 1000-1005 (2017).

A. Schori, et al., "X-ray ghost imaging with a laboratory source," Optics Express, vol. 25, Issue 13, pp. 14822-14828 (Jun. 26, 2017).

Hong-Chao Liu, et al., "Computational ghost imaging of hot objects in long-wave infrared range," Appl. Phys. Lett., vol. 111, Issue 3, pp. 1-5(Jul. 2017).

Kyungmin Hwang, et al., "Frequency selection rule for high definition and high frame rate Lissajous scanning," Scientific Reports, vol. 7, pp. 1-8 (Oct. 2017).

Meng Lyu, et al., "Deep-learning-based ghost imaging," Scientific Reports, vol. 7, pp. 1-6 (Dec. 19, 2017).

Stephen Bauters, et al., "Polycapillary Optics Based Confocal Micro X-ray Fluorescence and X-ray Absorption Spectroscopy Setup at The European Synchrotron Radiation Facility Collaborative Research Group Dutch-Belgian Beamline, BM26A," Anal. Chem., vol. 90, Issue 3, pp. 2389-2394 (Jan. 10, 2018).

Ai-Xin Zhang, et al., "Tabletop x-ray ghost imaging with ultra-low radiation," Optica, vol. 5, Issue 4, pp. 374-377 (Apr. 2018).

Sadao Ota, et al., "Ghost cytometry," Science, vol. 360, Issue 6394, pp. 1246-1251 (Jun. 15, 2018).

David Ceddia, et al., "Random-matrix bases, ghost imaging, and x-ray phase contrast computational ghost imaging," Phys. Rev. A, vol. 97, pp. 1-15 (Jun. 19, 2018).

S. Li, et al., "Electron Ghost Imaging," Phys. Rev. Lett., vol. 121, pp. 1-5 (Sep. 11, 2018).

Björn De Samber, et al., "Three-dimensional X-ray fluorescence imaging modes for biological specimens using a full-field energy dispersive CCD camera," J. Anal. At. Spectrom., vol. 34, pp. 2083-2093 (2019).

Y. Klein, et al., "X-ray computational ghost imaging with single-pixel detector," Optics Express, vol. 27, Issue 3, pp. 3284-3293 (Feb. 4, 2019).

Marcus M. Noack, et al., "A Kriging-Based Approach to Autonomous Experimentation with Applications to X-Ray Scattering," Scientific Reports, vol. 9, pp. 1-18 (Aug. 2019).

Anicó Kulow, et al., "On the way to full-field X-ray fluorescence spectroscopy imaging with coded apertures," J. Anal. At. Spectrom., vol. 35, pp. 347-356 (2020).

Jean-Raymond Betterton, et al., "Reinforcement Learning for Adaptive Illumination with X-rays," IEEE International Conference on Robotics and Automation (ICRA), (2020).

Thomas J. Lane, et al., "What are the advantages of ghost imaging? Multiplexing for x-ray and electron imaging," Optics Express, vol. 28, Issue 5, pp. 5898-5918 (Mar. 2, 2020).

Yu-Hang He, et al., "Energy-Selective X-Ray Ghost Imaging," Chinese Physics Letters, vol. 37, Issue 4, (Apr. 2020).

Yu-Hang He, et al., "High-resolution sub-sampling incoherent x-ray imaging with a single-pixel detector," APL Photonics, vol. 5, Issue 5, pp. 1-7 (May 2020).

Andrew M. Kingston, et al., "Neutron ghost imaging," Phys. Rev. A, vol. 101, Issue 5, (May 18, 2020).

D. Sefi, et al., "X-ray imaging of fast dynamics with single-pixel detector," Optics Express, vol. 28, Issue 17, pp. 24568-24576 (Aug. 17, 2020).

Graham M. Gibson, et al., "Single-pixel imaging 12 years on: a review," Optics Express, vol. 28, Issue 19, pp. 28190-28208 (Sep. 14, 2020).

B. Sun, et al., "3D Computational Imaging with Single-Pixel Detectors," Science, vol. 340, Issue 6134, pp. 844-847 (May 17, 2023).

EP Office Action dated Sep. 30, 2024 in application 21894204.3.

* cited by examiner

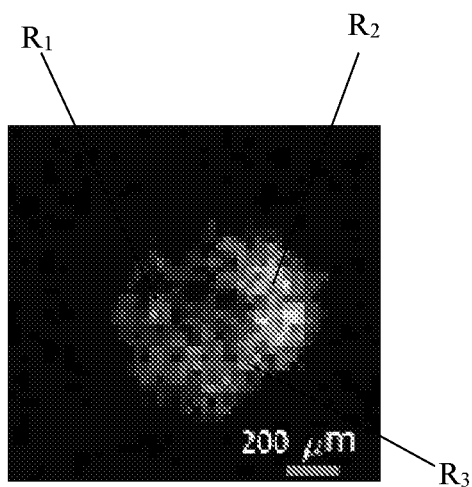
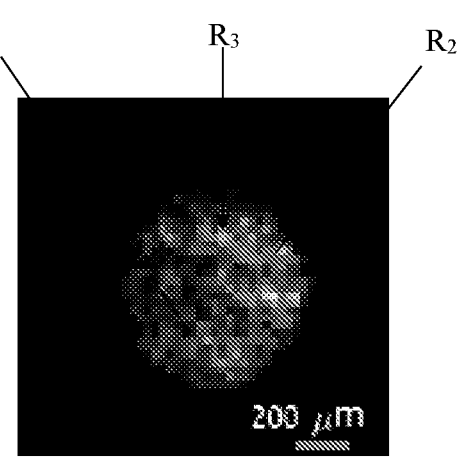
FIG. 5H  FIG. 5I
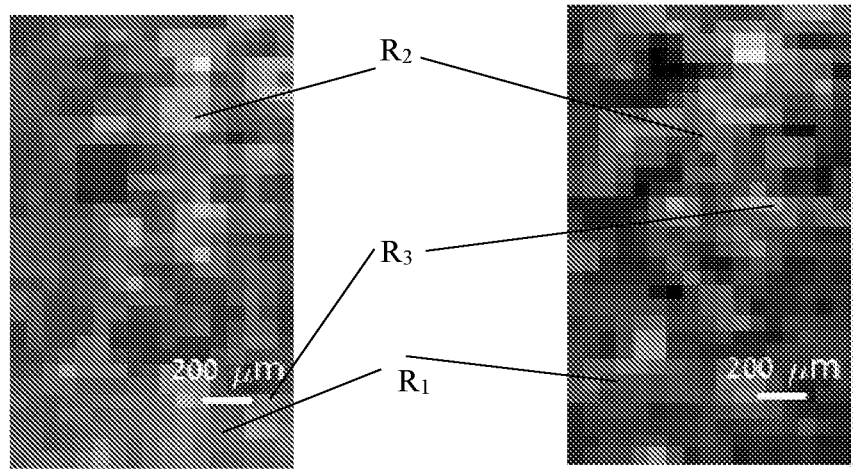
FIG. 5J  FIG. 5K

FIG. 6H  FIG. 6I

SYSTEM AND METHOD FOR MAPPING CHEMICAL ELEMENTS IN A SAMPLE

TECHNOLOGICAL FIELD

The invention is in the field of imaging techniques and relates to system and method for mapping chemical elements in a sample. The invention is particularly useful for X-ray fluorescence imaging to provide high-resolution chemical maps of samples.

BACKGROUND ART

References considered to be relevant as background to the presently disclosed subject matter are listed below:
1. S. Bauters, P. Tack, J. H. Rudloff-Grund, D. Banerjee, A. Longo, B. Vekemans, W. Bras, F. E. Brenker, R. van Silfhout, and L. Vincze, "Polycapillary Optics Based Confocal Micro X-ray Fluorescence and X-ray Absorption Spectroscopy Setup at The European Synchrotron Radiation Facility Collaborative Research Group Dutch—Belgian Beamline, BM26A," Anal. Chem. 90, 2389-2394 (2018).
2. G. Chen, S. Chu, T. Sun, X. Sun, L. Zheng, P. An, J. Zhu, S. Wu, Y. Du, and J. Zhang, "Confocal depth-resolved fluorescence micro-X-ray absorption spectroscopy for the study of cultural heritage materials: a new mobile endstation at the Beijing Synchrotron Radiation Facility," J. Synchrotron Radiat. 24, 1000-1005 (2017).
3. K. Tsuji, T. Matsuno, Y. Takimoto, M. Yamanashi, N. Kometani, Y. C. Sasaki, T. Hasegawa, S. Kato, T. Yamada, T. Shoji, and N. Kawahara, "New developments of X-ray fluorescence imaging techniques in laboratory," Spectrochim. Acta Part B At. Spectrosc. 113, 43-53 (2015).
4. A. Kulow, A. G. Buzanich, U. Reinholz, C. Streli, and M. Radtke, "On the way to full-field X-ray fluorescence spectroscopy imaging with coded apertures," J. Anal. At. Spectrom. 35, (2020).
5. A. Haboub, A. A. Macdowell, S. Marchesini, and D. Y. Parkinson, "Coded aperture imaging for fluorescent x-rays," Rev. Sci. Instrum. 85, (2014).
6. B. De Samber, O. Scharf, G. Buzanich, J. Garrevoet, P. Tack, M. Radtke, H. Riesemeier, U. Reinholz, R. Evens, K. De Schamphelaere, G. Falkenberg, C. Janssen, and L. Vincze, "Three-dimensional X-ray fluorescence imaging modes for biological specimens using a full-field energy dispersive CCD camera," J. Anal. At. Spectrom. 34, 2083-2093 (2019).
7. J. R. Betterton, D. Ratner, S. Webb, and M. Kochenderfer, "Reinforcement Learning for Adaptive Illumination with X-rays," in Proceedings—IEEE International Conference on Robotics and Automation (2020).
8. K. Hwang, Y. H. Seo, J. Ahn, P. Kim, and K. H. Jeong, "Frequency selection rule for high definition and high frame rate Lissajous scanning," Sci. Rep. 7, (2017).
9. M. M. Noack, K. G. Yager, M. Fukuto, G. S. Doerk, R. Li, and J. A. Sethian, "A Kriging-Based Approach to Autonomous Experimentation with Applications to X-Ray Scattering," Sci. Rep. 9, (2019).
10. J. H. Shapiro, "Computational ghost imaging," Phys. Rev. A 78, (2008).
11. G. M. Gibson, S. D. Johnson, and M. J. Padgett, "Single-pixel imaging 12 years on: a review," Opt. Express 28, 28190 (2020).
12. B. Sun, M. P. Edgar, R. Bowman, L. E. Vittert, S. Welsh, A. Bowman, and M. J. Padgett, "3D Computational Imaging with Single-Pixel Detectors," Science. 340, 844-847 (2013).
13. Y. Klein, A. Schori, I. P. Dolbnya, K. Sawhney, and S. Shwartz, "X-ray computational ghost imaging with single-pixel detector," Opt. Express 27, 3284 (2019).
14. O. Sefi, Y. Klein, E. Strizhevsky, I. P. Dolbnya, and S. Shwartz, "X-ray imaging of fast dynamics with single-pixel detector," Opt. Express 28, 24568 (2020).
15. Y.-H. He, A.-X. Zhang, W.-K. Yu, L.-M. Chen, and L.-A. Wu, "Energy-Selective X-Ray Ghost Imaging," Chinese Phys. Lett. 37, 044208 (2020).
16. A.-X. Zhang, Y.-H. He, L.-A. Wu, L.-M. Chen, and B.-B. Wang, "Tabletop x-ray ghost imaging with ultra-low radiation," Optica 5, 374 (2018).
17. S. Ota, R. Horisaki, Y. Kawamura, M. Ugawa, I. Sato, K. Hashimoto, R. Kamesawa, K. Setoyama, S. Yamaguchi, K. Fujiu, K. Waki, and H. Noji, "Ghost cytometry," Science. 360, 1246-1251 (2018).
18. N. Tian, Q. Guo, A. Wang, D. Xu, and L. Fu, "Fluorescence ghost imaging with pseudothermal light," Opt. Lett. 36, 3302 (2011).
19. O. Katz, Y. Bromberg, and Y. Silberberg, "Compressive ghost imaging," Appl. Phys. Lett. 95, 131110 (2009).
20. M. Lyu, W. Wang, H. Wang, H. Wang, G. Li, N. Chen, and G. Situ, "Deep-learning-based ghost imaging," Sci. Rep. 7, 17865 (2017).
21. H.-C. Liu and S. Zhang, "Computational ghost imaging of hot objects in long-wave infrared range," Appl. Phys. Lett. 111, 031110 (2017).
22. Y. H. He, A. X. Zhang, M. F. Li, Y. Y. Huang, B. G. Quan, D. Z. Li, L. A. Wu, and L. M. Chen, "High-resolution sub-sampling incoherent x-ray imaging with a single-pixel detector," APL Photonics 5, (2020).
23. V. Studer, J. Bobin, M. Chahid, H. S. Mousavi, E. Candes, and M. Dahan, "Compressive fluorescence microscopy for biological and hyperspectral imaging," Proc. Natl. Acad. Sci. 109, E1679-E1687 (2012).
24. A. M. Kingston, G. R. Myers, D. Pelliccia, F. Salvemini, J. J. Bevitt, U. Garbe, and
D. M. Paganin, "Neutron ghost imaging," Phys. Rev. A 101, 053844 (2020).
26. S. Li, F. Cropp, K. Kabra, T. J. Lane, G. Wetzstein, P. Musumeci, and D. Ratner, "Electron Ghost Imaging," Phys. Rev. Lett. 121, 114801 (2018).
26. D. Pelliccia, A. Rack, M. Scheel, V. Cantelli, and D. M. Paganin, "Experimental X-Ray Ghost Imaging," Phys. Rev. Lett. 117, 113902 (2016).
27. A. Schori and S. Shwartz, "X-ray ghost imaging with a laboratory source," Opt. Express 25, 14822 (2017).
28. H. Yu, R. Lu, S. Han, H. Xie, G. Du, T. Xiao, and D. Zhu, "Fourier-Transform Ghost Imaging with Hard X Rays," Phys. Rev. Lett. 117, 113901 (2016).
29. T. J. Lane and D. Ratner, "What are the advantages of ghost imaging? Multiplexing for x-ray and electron imaging," Opt. Express 28, 5898 (2020).
30. D. Ceddia and D. M. Paganin, "Random-matrix bases, ghost imaging, and x-ray phase contrast computational ghost imaging," Phys. Rev. A 97, (2018).

Acknowledgement of the above references herein is not to be inferred as meaning that these are in any way relevant to the patentability of the presently disclosed subject matter.

BACKGROUND

X-ray fluorescence (XRF) is a powerful method for identification and mapping of the chemical compositions of a sample in intriguing applications that are exploited in a broad range of fields from fundamental science to industry and cultural heritage. Examples for scientific disciplines where XRF plays a prominent role include material science, electrochemistry, biology, paleontology, and archeology. Industrial applications include, for example, metal analyzers for small parts that are produced by automotive and aerospace industries. In cultural heritage XRF is very useful in providing information on hidden layers of famous paintings.

Generally, in its simplest form XRF actually provides no spatial information since a detector typically used in XRF systems collects radiation from large areas. However, in recent decades, spatially resolved XRF techniques have been developed and their advent opens appealing opportunities in many fields. The main challenge for conventional approach in spatially resolved XRF measurements is that, in contrast to transmission measurements, the fluorescence is nondirectional.

According to conventional approaches for spatially resolved XRF measurements, raster-scanning of a sample by focused beams is used to derive information about two-dimensional chemical maps of the samples. With this procedure, the spatial information is retrieved since at each measurement point only a small portion of the sample is irradiated (by the focused beam) and the spatial resolution is determined by the spot size of the input beam. When the spot size is of the order of several microns, the method is known as "micro-XRF". Extensions to three dimensions are also possible by using either computed tomography or confocal X-ray microscopy, but their implementation is rather challenging.

The above-described XRF imaging with focused beams has already been used for chemical element selective imaging and in particular demonstrated for biomedical imaging. However, while x-ray fluoresce imaging approaches are suitable for inorganic material inspection and for bio-imaging of small animals, its implementation for medical imaging or for nondestructive imaging remains very challenging. This is because the technique relies on slow raster scanning. The application of lenses (or curved mirrors) for photon energies that are applicable for medical imaging and for nondestructive imaging is another major fundamental challenge.

Ghost fluorescence imaging (GFI) has been developed and realized with pseudothermal light. The visibility and resolution of the images have shown the improved quality of the fluorescence ghost imaging.

Computational ghost imaging at x-ray wavelengths using a single-pixel detector has been demonstrated [13]. This technique utilizes a known designed mask as a spatial modulator that induces intensity fluctuations in a probe beam, enabling to compute the propagation of the electromagnetic field in the absence of the investigated object. These calculations were correlated with the measured data when the object is present to reconstruct the images of 50 µm and 80 µm slits.

General Description

There is a need in the art for a system and a method for reconstruction of chemical element maps in a sample enabling high-spatial resolution images and suitable characterization of elements in the sample. The system and measurement technique described herein may provide a very useful tool not only for high resolution chemical element maps, but also for inspection to elements and materials that are not detectable at the present. Such measurement is generally highly beneficial for various applications in many fields.

XRF techniques that are currently used require focusing of the x-ray beam, which strongly inhibits their ability to provide high-resolution imaging since focusing of x-ray radiation is difficult, especially at high photon energies, thus the ability to use small spot sizes in a broad photon energy range is unique to very few synchrotron beamlines and x-ray free electron lasers. Up to date, the highest resolution achieved with tabletop sources is several microns. However, it is achievable only in a very limited range of photon energies and at the expense of a significant loss of the input flux. Moreover, in almost all practical implementations of micro-XRF the spatial information is obtained by raster scanning. This is a very slow process since the scan is done over every point of sample. For large samples and for three-dimensional imaging the measurement time is several days.

The present invention utilizes the general principles of computational ghost imaging, which is modified according to the invention to be advantageously used in x-ray fluorescence (XRF) techniques. This allows for obtaining high-resolution images of a sample. Furthermore, the invention provides a focusing free system that at least partially overcomes the drawbacks described above.

Generally, full field XRF are implemented by photon energy resolving pixelated detectors with capabilities to provide two-dimensional chemical maps in a single frame. These techniques are performed by using either simple or coded apertures in front of the pixelated detector to address the problem of the fluorescence nondirectional radiation. However, the spatial resolution and the field of view (for a fixed number of pixels) are limited. Moreover, the quantum efficiency of the detectors drops very quickly at photon energies higher than 20 keV, there are inflexible constraints on the distance between the sample and the detector, and the measurements cannot provide three-dimensional information without additional lenses, but this addition introduces severe challenges, and the performances of the system are very limited. Another approach to reduce the duration of XRF measurements is based on scanning procedures and information that is obtained from the sample during the scan to improve the scanning efficiency. However, focusing of the input x-ray beam is still required.

The present invention provides a new approach for chemical element mapping requiring a significantly smaller number of measurements/samplings and therefore reduces the image reconstruction time as compared to standard techniques, by enabling effective use of compressed sensing and possibly also artificial intelligence algorithms to interpret the measured data and recover/reconstruct the signal.

Generally, compressed sensing is based on the principle that, through optimization, the sparsity of a signal can be exploited to recover it from far fewer samples/measurements than required by the Nyquist-Shannon sampling theorem. There are two conditions under which such recovery is possible. The first one is sparsity, which requires the signal to be sparse in some domain, and the second one is incoherence between the measurement matrix and the sparsity basis.

The present invention utilizes XRF imaging which is "spectral" imaging, i.e. measured data (image data) is in spectral/frequency domain, and thus for each detected spectral response (emission line) associated with a certain chemical element, the signal meets the sparsity condition in the spectral domain, and thus, by using a plurality of different encoding intensity patterns in the measurements and compressed sensing for measured data processing provides for reconstruction of chemical elements' map since the measured spectral signal is directly indicative of the chemical element.

Thus, according to one broad aspect of the present invention there is provided a measurement system for determining spatial distribution of chemical elements in a sample, the system includes a measurement unit which includes a primary radiation generator configured and operable to produce primary radiation having predetermined spectral characteristic adapted to excite a number M (M≥1) of predetermined chemical elements in the sample to induce M respective secondary radiation responses, respectively, from the sample. The measurement unit also includes a detection unit configured and operable to generate spectral measured data indicative of intensity of detected radiation. The primary radiation exciting the sample is in the form of a sequence of two or more encoded radiation patterns, each having its predetermined characteristic spatial intensity pattern of the primary spectral radiation. The measured data are in the form of a sequence of measured spectral data pieces comprising two or more measured spectral data pieces indicative of two or more secondary radiation responses from the sample, each being modulated by the respective one of the two or more predetermined spatial intensity patterns of the encoded primary radiation and characterized by sparsity in the spectral domain with respect to each spectral component of the secondary radiation response. The measurement system also includes a control system, which includes a data processor configured and operable for receiving and analyzing the measured data and determining data indicative of spatial distribution of said M chemical elements in the sample. The analyzing of the measured data includes utilizing modulation encoding data about said predetermined characteristic spatial intensity patterns of the primary spectral radiation and applying compressed sensing processing to the measured data to thereby determine correlation data comprising correlation between each of the spectral measured data pieces and the respective predetermined characteristic spatial intensity pattern of the primary radiation, and extract, from the correlation data, location data where each spectral component of the detected secondary responses is originated in the sample.

The data processor may be further configured to operable to utilize pre-stored reference spectral data about secondary radiation responses of various chemical elements to said predetermined radiation and associate the location data of the spectral responses with the respective chemical elements, to thereby reconstruct the chemical element map of the sample.

It should be noted that the primary exciting radiation used in the present invention is of the kind exciting core electrons or inner shell electrons of the chemical elements to cause secondary radiation response thereof (emission line). Such exciting radiation may be electromagnetic radiation or charges particles radiation (e.g. electron beam). The primary exciting radiation is at times referred to herein below as "electromagnetic radiation", but this term should be interpreted broadly to cover also charged particles' radiation, in particular electron beam.

The electromagnetic radiation can be of x-ray and/or gamma-ray spectral ranges.

The primary radiation generator includes a source of the primary radiation having the predetermined spectral characteristic, and a modulation device accommodated in a path of said primary radiation propagation towards the sample. The modulation device is configured and operable to successively encode said primary radiation by two or more different radiation transmission functions thereby producing the sequence of the two or more encoded radiation patterns of the primary radiation each characterized by the corresponding predetermined characteristic spatial intensity pattern of the primary radiation.

The modulation device can include a set of two or more spatial modulators, each having a different pattern of features defining the respective radiation transmission function. The modulation device is configured and operable to sequentially accommodate each one of the two or more of the spatial modulators in the path of the primary radiation propagation to the sample.

In some embodiments this is implemented by using a single patterned element defining an array of spaced-apart differently patterned regions, each such region representing a patterned structure acting as the spatial modulator. Shifting/displacing the patterned element with respect to the path of the primary radiation propagation provides sequential accommodation of the two or more different patterned structures (modulators) in the path to interact with the primary radiation.

As mentioned above, the primary radiation may be electron beam radiation. It should be noted that electron beam-based inspection can provide spatial resolution exceeding the nanometer scale, and utilizing such electron beam as exciting radiation in the technique of the present invention provides for simplifying scanning of encoding patterns of spatial modulators to provide the modulation encoding data.

The spatial modulator can be in the form of a diffuser or a mask modulating the primary radiation to produce structure radiation characterized by the predetermined characteristic spatial intensity pattern of the primary radiation.

In some embodiments, the detection unit includes at least one pixelated detector.

In some embodiments, the detection unit includes one or more single-pixel detector.

The measurement system can be configured and operable to perform preliminary measurements to determine modulation encoding data indicative of the sequence of the two or more predetermined characteristic spatial intensity patterns of the primary radiation, and associate said sequence of the two or more predetermined characteristic spatial intensity patterns of the primary radiation measured by the at least one pixelated detector with the respective sequence of the measured spectral data pieces of the secondary radiation responses of the sample.

The control system is configured and operable to utilize reference spectral data indicative of secondary radiation responses of the M chemical elements to said primary radiation in association with the location data extracted from the measured data, and reconstruct map data indicative of spatial distribution of each of the M chemical elements in the sample.

The reference spectral data are pre-stored either in a storage utility of the control system or in external database accessible by the control system. The control system can thus be configured and operable for data communication with the external database using any known suitable communication technique.

According to another broad aspect of the present invention there is provided a method for determining spatial distribution of chemical elements in a sample. The method includes:

provides predetermined modulation encoding data comprising two or more predetermined spatial intensity patterns of primary radiation, each corresponding to the primary radiation encoded by applied thereto respective two or more different spatial transmission functions;

performing a plurality of spectral measurements on the sample including a sequence of two or more spectral measurements comprising: exciting the sample with said primary radiation encoded by said two or more different spatial transmission functions, respectively, and having spectral characteristic adapted to excite a number M (M≥1) of chemical elements in the sample to induce M respective secondary radiation responses, respectively, from the sample, detecting the secondary radiation responses and generating spectral measured data comprising two or more measured spectral data pieces indicative of two or more secondary radiation responses from the sample, each being characterized by sparsity in spectral domain with respect to each spectral component of the secondary radiation response and being modulated by the respective one of the two or more predetermined characteristic spatial intensity patterns of the encoded primary radiation; and analyzing the spectral measured data and determining data indicative of spatial distribution of said M chemical elements in the sample, said analyzing of the measured spectral data comprising: utilizing the modulation encoding data indicative of said sequence of the two or more predetermined spatial intensity patterns used in measurements on the sample and applying compressed sensing processing to the spectral measured data to determine correlation data describing correlation between each of the spectral measured data pieces and the respective predetermined spatial intensity pattern of the encoded primary radiation, and extract, from the correlation data, location data where each spectral component of the detected secondary responses is originated in the sample.

The technique of the present invention can be tuned/configured to detect only elements of certain characteristics (e.g., only metals). This is significantly useful for example for security screening. Hence, this may be a way to protect the privacy of inspected passengers since the system can be "blind" to anything that does not emit fluorescence at the selected emission line. This is in contrast to all other x-ray imaging techniques that image the body of the passengers through their clothes. The present invention further provides imaging of objects that are embedded in noisy environment such as scattering medium and medium that contains a large number of other objects and elements. This is very useful for example in medical imaging, security screening, or nondestructive imaging.

Thus, the present invention provides a fast high-resolution chemical element mapping technique without focusing and without moving the sample being inspected. The measurement system is relatively simple, thus reducing the cost involved in the sample inspection, and providing improved mechanical stability. The technique of the invention provides for measurements with a significantly smaller number of sampling points and the applicability for a broad range of photon energies, as compared to standard techniques of the kind specified.

For example, medical imaging, which is performed at photon energies where lenses are not practical and where the low contrast between various tissues is the main challenge, the use of the technique of the present invention is beneficial. Indeed, today, to improve the visibility and quality of images of soft tissues, contrast agents are used since their transmission contrast is higher than the transmission contrast between different types of soft tissues. However, even with the contrast agents the visibility is limited. If instead the technique of the invention is used to measure the fluorescence from the same contrast agents, the quality of the images can be increased, or, alternatively, the dose of the measurements can be reduced, since the fluorescence contrast is significantly higher than the transmission contrast. Thus, the invention can advantageously be used in medical imaging to enhance the contrast of x-ray imaging and computed tomography by combining with fluorescent materials. Furthermore, the invention can be used for replacing current methods that rely on radioactive chemicals (the radioactive isotopes can be replaced by non-radioactive isotopes of the same chemical element). This is an advantage for example, at hospitals, wherein, storage of a large number of radioactive isotopes there, is a major challenge nowadays.

BRIEF DESCRIPTION OF THE DRAWINGS

In order to better understand the subject matter that is disclosed herein and to exemplify how it may be carried out in practice, embodiments will now be described, by way of non-limiting example only, with reference to the accompanying drawings, in which:

FIGS. 5A-5K show experimental setups and results, wherein FIGS. 5A and 5B show, respectively, setups of the first and second stages of the experiment, and FIGS. 5C-show the experimental results;

FIGS. 6A-6J exemplify another experiments conducted by the inventors, wherein

FIGS. 6A and 6B show, respectively, the setups of the first and second stages of the experiment, and FIGS. 6C-6J show the experimental results;

DETAILED DESCRIPTION OF EMBODIMENTS

The inventors have developed a novel approach for identifying and locating various chemicals in a sample being inspected enabling to generate high resolution chemical map of the sample.

Figure 1:
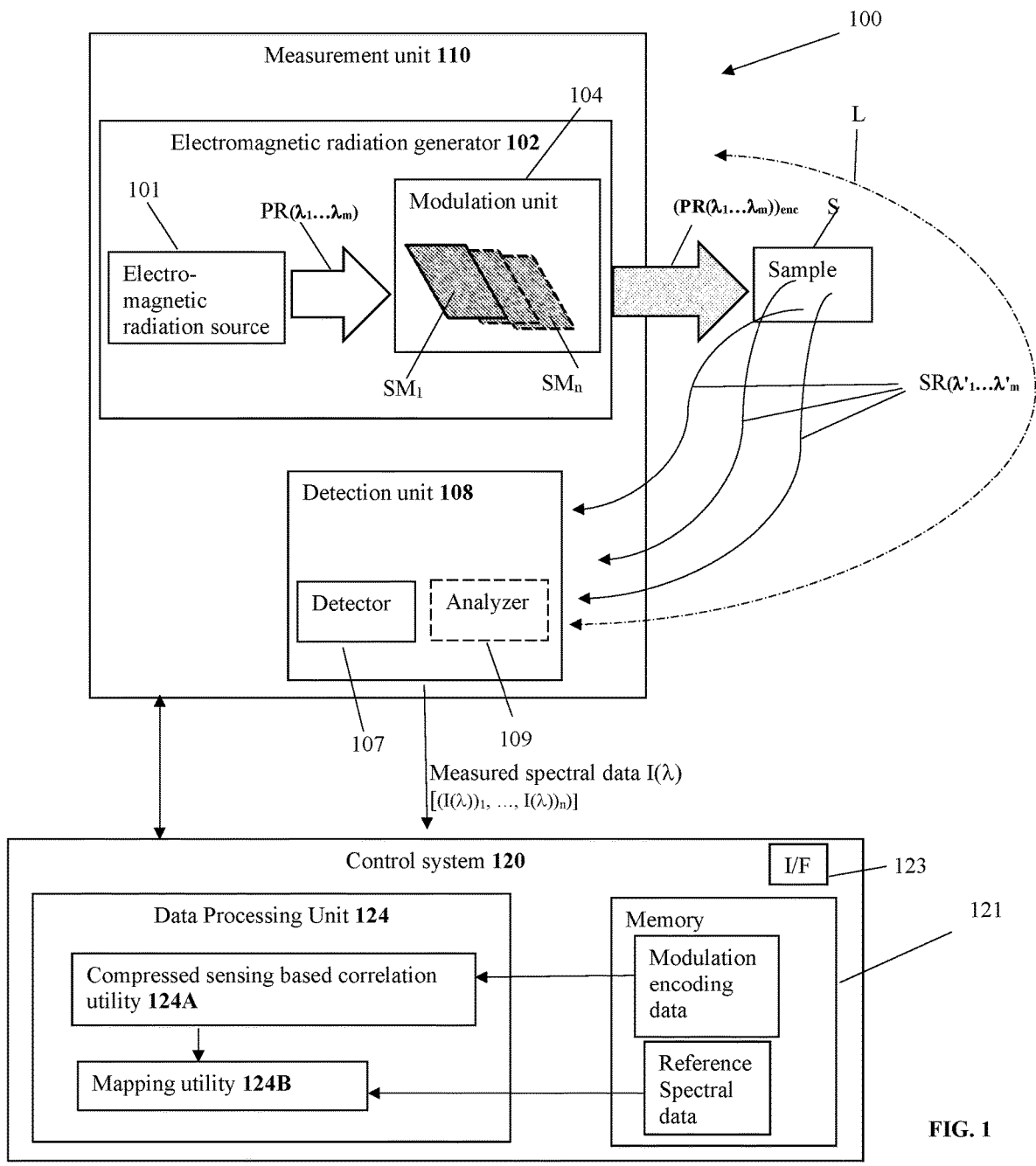
FIG. 1 is a block diagram of the system of the invention for determining spatial distribution of chemical elements in a sample.

Reference is made to FIG. 1 illustrating, by way of a block diagram, a measurement system 100 configured and operable according to the principles of the present invention for inspecting a sample S and determining spatial distribution of chemical elements in the sample S. Each such chemical element is of the kind emitting its characteristic secondary radiation (typically fluorescence) in response to predetermined primary radiation (exciting radiation), typically x-ray or gamma-ray radiation adapted to excite the core electrons of the chemical elements. In the description below, such exciting/primary radiation is referred to as x-ray radiation.

Frequency responses (emission lines) of various chemical elements are generally known and form reference spectral data, which can be stored in a database accessible by the system 100.

The system 100 includes a measurement unit 110 and a control system 120. The measurement unit 110 includes a primary radiation generator 102 configured and operable to produce predetermined encoded primary radiation $(PR(\lambda_1 \ldots \lambda_m))_{ene}$ which has spectral characteristics (M spectral components/ranges) adapted to excite a number M (generally, M≥1) of chemical elements in the sample S to induce M respective secondary radiation responses $SR(\lambda'_1 \ldots \lambda'_m)$ from the sample and is encoded by spatial intensity distribution/pattern. Also provided in the measurement unit 110 is a detection unit 108 configured and operable to generate spectral measured data indicative of intensity of detected radiation $I(\lambda)$. The detection unit 108 includes a detector 107, which may be either of the type capable of resolving photon energy (spectrometer), or may alternatively be equipped with a spectral analyzer 109.

The primary radiation generator 102 is configured and operable such that the encoded primary radiation $(PR(\lambda_1 \ldots \lambda_m))_{enc}$ incident on the sample is in the form of a sequence of N (generally, N≥2) differently encoded radiation patterns $(PR\ enc)_1, \ldots, (PR_{enc})_n$ each having its predetermined characteristic spatial intensity pattern of the primary radiation having said spectral characteristic. Accordingly, the radiation coming from the sample includes a sequence of N secondary radiation responses $SR(\lambda'_1 \ldots \lambda'_m)_1 \ldots SR(\lambda'_1 \ldots \lambda'_m)_n$ each encoded by spatial information induced by the respective encoded primary radiation exciting the sample. This encoded radiation is detected by the spectrometric detection unit, which generates corresponding measured spectral data in the form of a sequence of N encoded measured spectral data pieces $(I(\lambda')_1, \ldots I(\lambda')_n)$, where each encoded measured data piece is indicative of the secondary radiation response(s) of the chemical element(s) in the sample. It should be understood that here, for simplicity, $I(\lambda')_i$ corresponds to the detected/measured spectral intensity which may include all the spectral components (emission lines) of the radiation responses of various chemical elements in response to the primary radiation encoded by i-th spatial intensity pattern. The measured spectral data are processed and analyzed by the control system 120, as will be described further below.

Thus, the entire measurement cycle for identifying and locating M chemical elements includes excitation of the sample by M spectral components/ranges, each being implemented as a sequence of N excitations by N encoded primary radiation spectra. It should be noted that, generally, each encoded primary radiation may have spectral characteristic intended to excite a specific one of M chemical elements and induce a response of a single emission line. In this case, the entire measurement cycle includes M repetitions (measurement sessions) of N encoded sequences with different spectral characteristics in each measurement session.

According to the measurement technique of the invention, each measured spectral data piece (obtained in a single excitation) is indicative of M secondary radiation responses from the sample, each being modulated by the respective one of N encoding spatial intensity patterns. The measured data piece is thus characterized by sparsity in spectral domain with respect to each spectral component of the secondary radiation response (each chemical element) while embedding spatial information where each spectral component of the detected secondary response is originated.

As shown in the figure, the x-ray generator 102 includes an x-ray source 101 generating primary radiation of predetermined spectral characteristics $PR(\lambda_1 \ldots \lambda_m)$ and a modulation device 104 located in a general path of propagation of the primary radiation towards the sample S. The modulation device 104 is configured and operable to successively encode the primary radiation by N (two or more) different radiation transmission functions, thereby producing the above-described sequence of N encoded radiation patterns of the primary radiation, each characterized by the corresponding characteristic spatial intensity pattern of the primary radiation, $(PR_{enc}(\lambda,x,y))_1, \ldots, (PR_{enc}(\lambda,x,y))_n$.

It should be noted that, generally, the encoding of the primary radiation by spatial information is implemented by interacting the primary radiation with the modulation device. This can generally be implemented in either one of reflection or transmission mode, depending on the configuration of modulators (i.e., the modulator reflects or transmits a spatial intensity pattern of the primary radiation towards the sample. Practically, however, transmitting modulators are simpler in use, and the invention is therefore described herein in relation to the transmission operational mode of the system.

The modulation device 104 is configured to define a set of N different radiation transmission functions $I_1(x,y), \ldots I_n(x,y)$. The modulation device 104 may include a set of N spatial modulators $SM_1 \ldots SM_n$. Each i-th spatial modulator $SM_i$ has a different pattern of features defining the respective i-th radiation transmission function. The modulation device may be configured to sequentially accommodate each one of N spatial patterns in the propagation path of the primary radiation to the sample, thus sequentially encoding the primary radiation by the different spatial transmission function. Each j-th encoded primary radiation, having predetermined spectral characteristic, is thus characterized by a predetermined j-th spatial intensity pattern $I_j(x,y)$.

As will be described further below, the modulating spatial intensity patterns are predetermined, e.g. via prior knowledge of the pattern of features in each spatial modulator or via preliminary measurement of the transmission pattern of each spatial modulator.

The control system 120 is in data communication with the detection unit 108 and possibly also with the radiation generator 102. It should be noted that such data communication may be via wires or any suitable type of wireless communication. The control system 120 is generally a computer device/system having such main functional utilities as data input/output interface 123, memory utility 121, and a data processor 124.

The data processing unit 124 is configured and operable to receive and analyze the measured spectral data $(I(\lambda))_1, \ldots I(\lambda))_n$ encoded by multiple spatial intensity patterns, as described above, and determining data indicative of spatial distribution of the M chemical elements in the sample S. To this end, the data processor utilizes known (predetermined) modulation encoding data to process the spectral measured data by compressed sensing scheme to determine the location data where each spectral component of the detected secondary responses is originated in the sample, and then utilizes the reference spectral data about the secondary spectral responses (emission lines) of various chemical elements to associate the location data with the chemical elements, thus reconstructing the chemical elements' map. This will be described more specifically further below.

The modulation encoding data includes data indicative of the sequence of the N modulating/encoding spatial intensity patterns $I_1(x,y) \ldots I_n(x,y)$ being applied to the primary radiation during the sequential measurements.

For example, the N modulators are assigned with their respective unique identification data/codes $ID_1, \ldots, ID_n$ and these codes are stored in a storage device (e.g. internal memory of the control system) in association with respective predetermined characteristic spatial intensity patterns $I_1(x, y), \ldots I_n(x,y)$. The IDs may be indicated on/read from the modulators.

The data processor 124 includes a compressed sensing based correlation utility 124A, and a mapping utility 124B. The correlation utility 124A is configured to utilize the predetermined data about the sequence of the N spatial intensity patterns $I_1(x,y), \ldots, I_n(x,y)$ used in the sequence of measurements on the sample and apply compressed sensing processing to the measured data pieces to determine correlation data. The latter is the correlation between the sequence of measured spectral intensities of M spectral components (emission lines) with the respective N encoding spatial intensity patterns, forming a vector/matrix T:

$$I(\lambda^{(1)}) \rightarrow I^{(1)}_1(x,y), \ldots, I^{(1)}_n(x,y)$$

$$I(\lambda^{(2)}) \rightarrow I^{(2)}_1(x,y), \ldots, I^{(2)}_n(x,y)$$

$$I(\lambda^{(m)}) \rightarrow I^{(m)}_1(x,y), \ldots, I^{(m)}_n(x,y)$$

Thus, the compressed sensing based correlation utility 124A generates correlation data in which: the spatial distribution of the spectral components (emission lines) returned from the various locations in the sample from M elements in response to the N encoded excitations (i.e. each chemical element) is represented by a vector/matrix X (which is to be extracted); the M measured encoded intensities of the corresponding emission lines are represented by the vector T; and N encoding spatial intensity patterns used in the spectral measurements are represented by matrix A in which every row is a set for a single j-th spectral component: $I(\lambda^{(j)}_1(x,y)), \ldots, I(\lambda^{(j)}_n(x,y))$. The vector T is equal to the product of the matrix A and the vector X:

$$AX=T$$

In order to determine the vector X to thereby extract the location data in the sample where each spectral component of the detected secondary responses is originated, the compressed sensing processing is applied to the measured data. The compressed sensing approach can be effectively used to determine the location data with the reduced number of encoded measurements (i.e. making the measurements practical) because the measured data piece relating to each spectral component, encoded by spatial distribution information, is characterized by high sparsity and incoherence conditions in the spectral domain. The compressed sensing utility utilizes the known information on the spatial structure of each image (measured data piece) defined by the spatial intensity pattern of the respective one of N modulators.

The compressed sensing processing results in the reconstructed spatial image for each of the spectral components in the secondary radiation responses, i.e. each chemical element. These data are then analyzed by the mapping utility 124B, which utilizes the pre-stored reference spectral data about emission lines of the chemical elements and overlays the images with these data to reconstruct the chemical element map.

Thus, in order to find the vector X representing the spatial distribution of the chemical elements with a minimal number of realizations/encoded measurements, and consequently to reduce the measurement time, the compressed sensing is used. There are various compressed sensing algorithms/models suitable to be used in the present invention. For example, in order to find the vector X, which represents the spatial distribution of a chemical element, the inventors have used the "total variation minimization by augmented Lagrangian and alternating direction algorithms" (TVAL3), utilizing the prior information on the structure of the image as described above.

The principles of compressed sensing processing are generally known and do not need to be described in detail, except to note the following: Compressed sensing indicates that a sparse signal under some basis may still be recovered even though the number of measurements is deemed insufficient by Shannon's criterion. For a given measurement vector T, instead of finding the sparsest solution of X to equation AX=T by a combinatorial algorithm, which is generally of non-deterministic polynomial-time hardness, one often chooses to minimize for example the total variation (TV) of X. In the context of compressed sensing, sufficient conditions for exact and stable recoveries are sparsity of the signal in some domain and incoherence.

The use of TV regularization makes the reconstructed images sharper by preserving the edges or boundaries more accurately. Instead of assuming the signal is sparse, the premise of TV regularization is that the gradient of the underlying signal or image is sparse. In other words, this compressed sensing scheme is based on the concept that the gradient of many objects in nature can be represented by a sparse matrix. Accordingly, for each spectral component in the measured data (i.e. each chemical element in the sample), the vector X can be constructed by minimizing the augmented Lagrangian:

$$\min_x \sum_{i=1}^m \|D_i x\|_2 \text{ s.t. } Ax = T, x > 0$$

where $D_i x$ is the $i^{th}$ component of the discrete gradient of the vector X. For example, if $X=\{2,5,7\}$, $D_1 x=5-2=3$, $D_2 x=7-5=2$.

The principles of the TVAL3 based processing are generally known and do not by themselves form part of the present invention. Some examples of such technique are described in the article C. Li, W. Yin, H. Jiang, and Y. Zhang, "An efficient augmented Lagrangian method with applications to total variation minimization," Comput. Optim. Appl. 56, 507-530 (2013), which is incorporated herein by reference with respect to this non-limiting example.

As described above, the compressed sensing processing utilizes the known data about the spatial intensity patterns (transmission functions) of encoding spatial modulators. Such spatial modulators may be implemented as diffusers or masks having patterns of spaced-apart features.

In order to selectively apply a different one of the plurality of encoding modulators to the primary radiation, a set of separate modulators can be used, each having a different pattern of features defining the respective radiation transmission function. These different modulators can be sequentially accommodated in the path of the primary radiation propagation to the sample.

Alternatively, the modulation device 102 can include a single spatial modulator unit configured with N spaced-apart differently patterned regions. Each such patterned region thus defines a different radiation transmission function and encodes the primary radiation by a respective predetermined spatial intensity pattern. The spatial modulator unit can thus be shiftable with respect to the propagation path of the primary radiation to sequentially cause the primary radiation to interact with the different patterned regions. This can be implemented by a lateral shift of the plate-like modulator unit, or by rotating a disk-like modulator unit.

Turning back to FIG. 1, there is illustrated that the secondary radiation response(s) originated at the sample (typically fluorescence) is non-directional and thus propagates in multiple random directions. Hence, in some embodiments, it might be preferable to detect the spectral responses from different directions. This can be implemented by utilizing two or more detection units arranged in a spaced-apart relationship around the sample with different angular orientations with respect to sample, shown by dashed path L, or by moving the detection unit towards different positions in said path in between measurement sessions.

Figure 2:
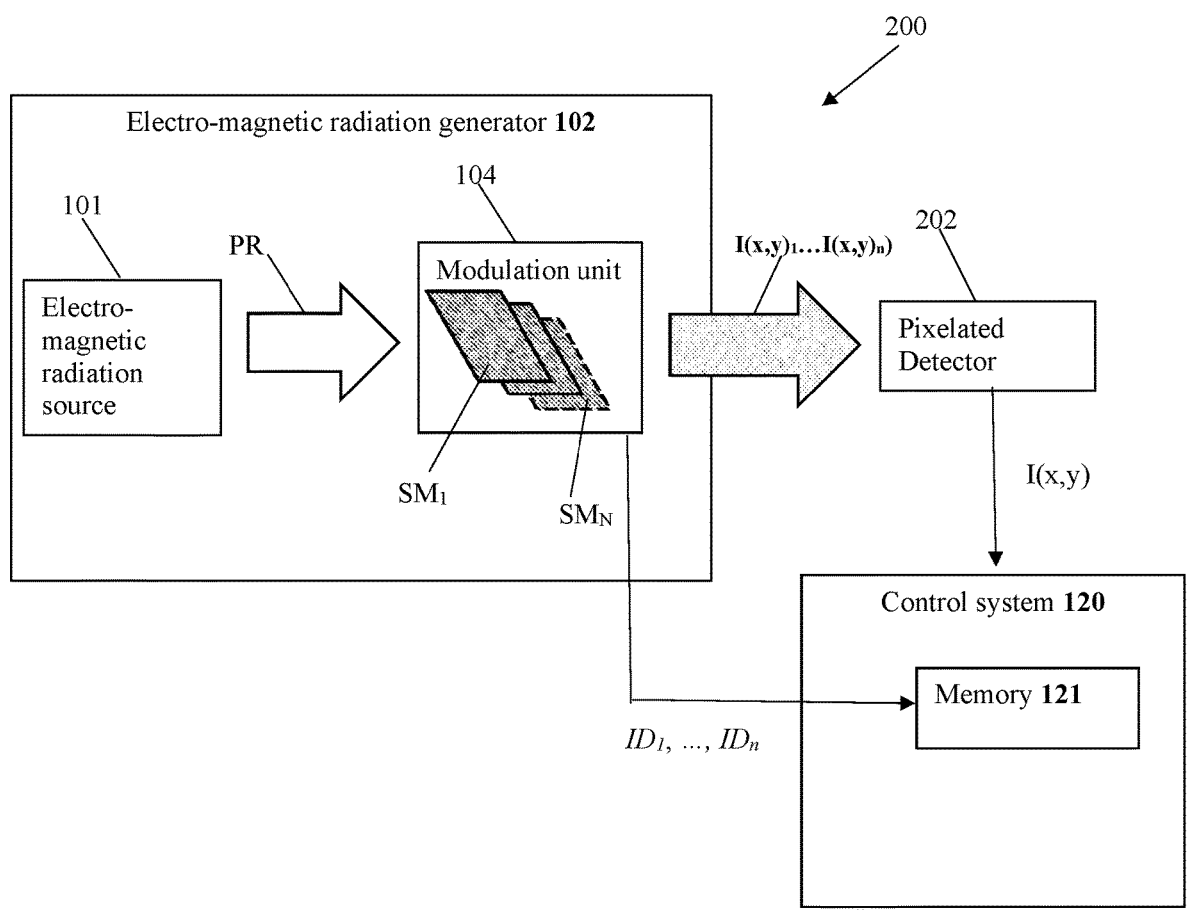
FIG. 2 is a block diagram of an exemplary setup for preliminary measurements to determine modulation encoding data indicative of a sequence of spatial intensity patterns of modulators used in the system of FIG. 1.

As described above, the data indicative of the encoding spatial intensity patterns of the modulators may be a priori known and stored in the memory. These data may be predetermined in preliminary measurements. This is schematically illustrated in FIG. 2.

A measurement setup 200 is used including the x-ray radiation generator 102 and a detection unit including a pixelated detector 202. The x-ray radiation generator 102 includes the x-ray radiation source 102 and spatial modulation device 104 configured and operable as described above. Each modulator (patterned structure) is assigned with its unique ID, and the measured spatial intensity pattern of the modulator is stored in the memory in association with its ID: the N spatial modulators $SM_1, \ldots, SM_n$ are associated with unique identification data $ID_1, \ldots, ID_n$. The use of the pixelated detector 202 provides for directly measuring of each of the spatial intensity patterns $I_1(x,y), \ldots I_n(x,y)$ of the modulators. It should be noted that the measurements conducted on the sample may or may not utilize a pixelated detector.

Figure 3A:
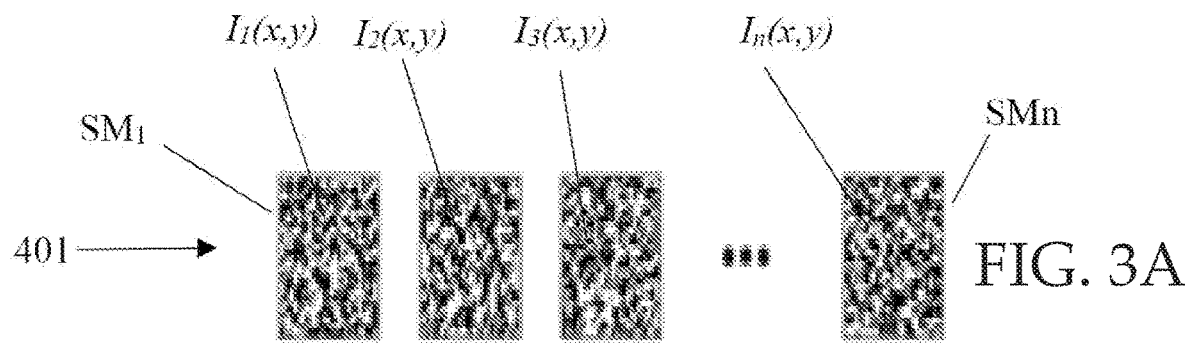
FIG. 3A-3C exemplify the operation of the system of the invention for reconstruction of the chemical map of the sample.
Figure 3B:
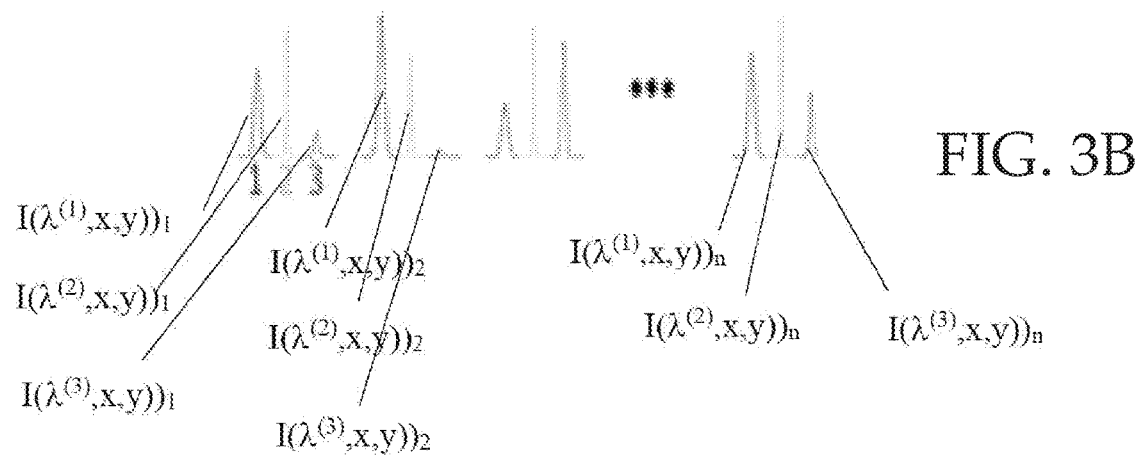
Figure 3C:
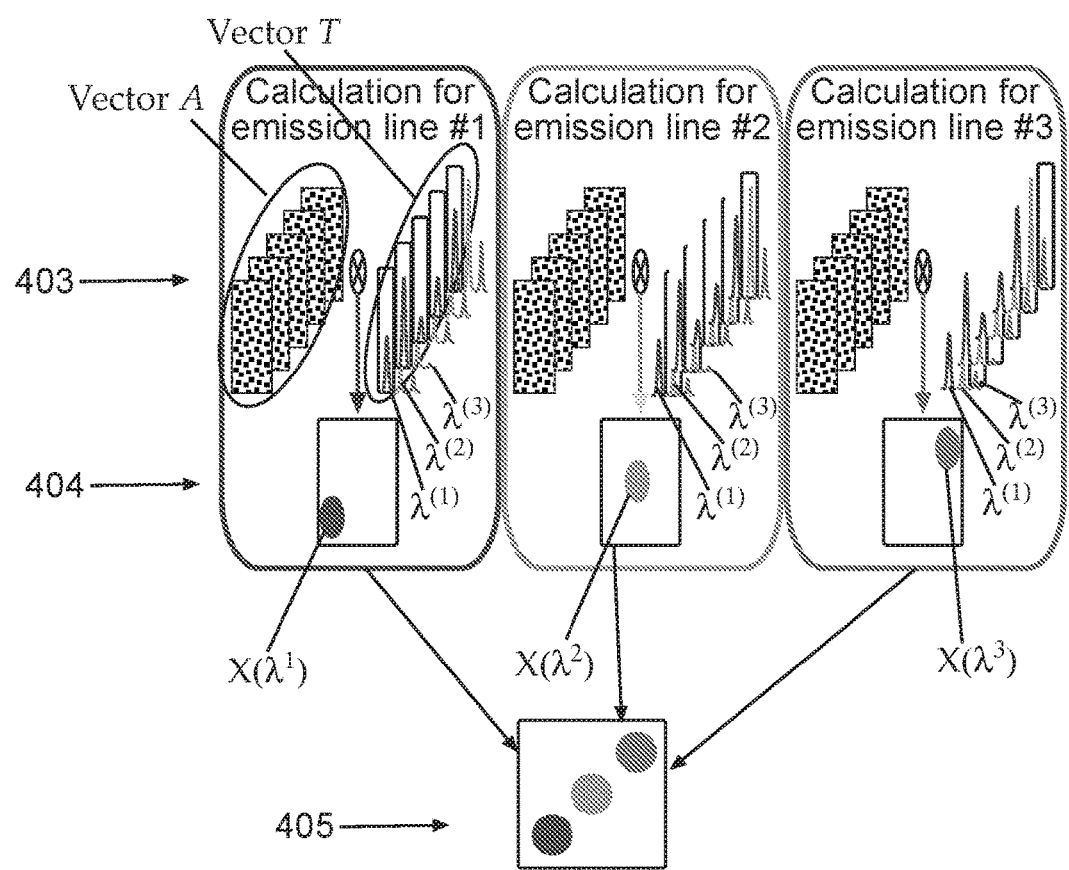
Figure 4:
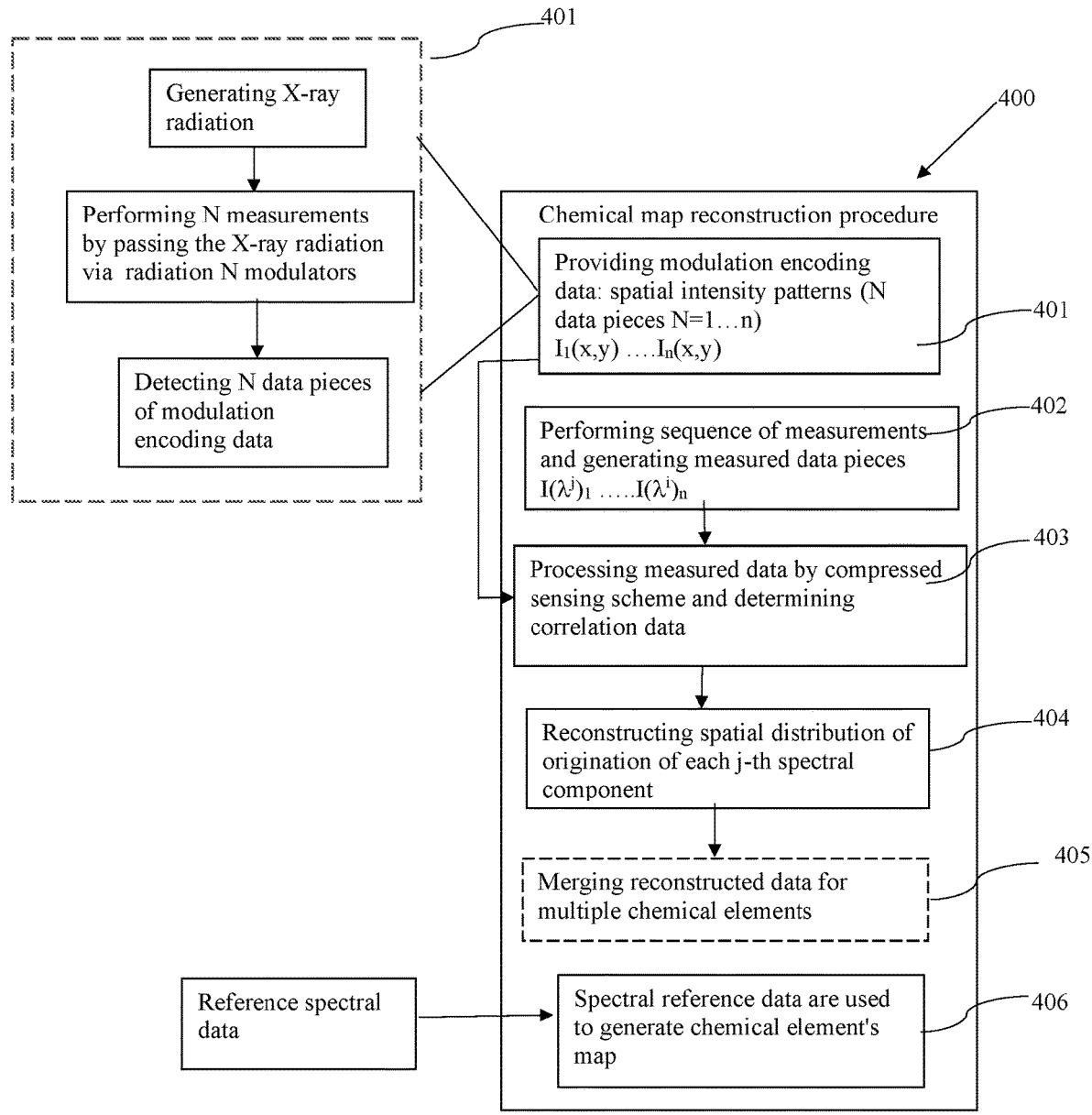
FIG. 4 is flow diagram of the method of the invention for spectral measurements and chemical map reconstruction according to some embodiments of the invention.

Reference is made to FIGS. 3A-3C and a flow diagram 400 of FIG. 4 illustrating more specifically a chemical map reconstruction procedure according to some embodiments of the invention.

As detailed in the flow diagram 400, the procedure includes providing modulation encoding data indicative of N characteristic spatial intensity patterns $I_1(x,y), \ldots, I_n(x,y)$ defining different spatial transmission function for use in encoding the predetermined primary radiation—step 401. As shown by dashed box in FIG. 4, and also in FIG. 3A, in a self-explanatory manner, this step 401 may be implemented off-line as a set of preliminary measurements (as described above with reference to FIG. 2) using N modulators configured as described above.

Then measurements are performed on the sample using the encoded primary radiation, as described above, and spectral measured data is generated—step 402.

As also described above, the measured spectral data piece may be obtained in a single excitation/measurement session by broad spectrum or by narrow spectrum. The measured data piece is thus characterized by sparsity in spectral domain with respect to each spectral component of the secondary radiation response (each chemical element) while embedding spatial information where each spectral component of the detected secondary response is originated.

The measured spectral data are processed by applying thereto a compressed sensing scheme while utilizing the modulation encoding data to thereby correlate the detected intensity of M spectral components (emission lines) from the M induced spectral responses with the N encoding spatial intensity patterns—step 403. This enables to determine the location data of the origination of each j-th spectral component in the sample and thus reconstruct the spatial distribution of each spectral origin in the sample—step 404.

The principles and results of this data processing are described above and are also illustrated in FIGS. 3B and 3C. FIG. 3B show N sets of encoded spectral measured data pieces, each including data indicative of three emission lines (M=3) for three spectral components $\lambda^{(1)}, \lambda^{(2)}, \lambda^{(3)}$ of the secondary radiation responses of the sample associated with three different chemical elements. As described above, the measured data are indicative of M spectra of the secondary radiation responses, each encoded by N spatial intensity patterns, such that the measured data includes, for each j-th spectral component of the secondary radiation response (i.e. each emission line associated with a specific chemical element), a sequence of N encoded measured spectral data pieces $(I(\lambda^{(j)}))_1, \ldots, I(\lambda^{(j)}))_n)$ in which spatial information about the encoding spatial intensity pattern of the primary information is embedded.

As shown in FIG. 3C, the detected intensity of each of the three emission lines of spectral components $\lambda^{(1)}, \lambda^{(2)}, \lambda^{(3)}$ (indicated in FIG. 3B) are correlated with the N encoding spatial intensity patterns (indicated in FIG. 3A and representing vector/matrix A as described above) resulting in the correlation data in the form of vector/matrix T. As described above, vector T is determined as AX=T where vector X represents the spatial distribution of each spectral component (emission line) returned from the sample in response to the N encoded excitations. The results of the compressed sensing processing scheme provides the location data for the origination of each of the spectral components $X(\lambda^1), X(\lambda^2), X(\lambda^3)$, as shown in FIG. 3C.

In some embodiments, the reconstructed data for all the M spectral components are then merged—step 405.

Then, the spectral reference data, i.e. chemical element corresponding to/associated with the emission line) are accessed from the memory and used to reconstruct the chemical elements' map in the sample—step 406.

The inventors have conducted experiments to demonstrate capabilities of the technique of the invention for constructing high-resolution chemical elements' maps. The experiments are conducted with a two-step approach. In both steps, x-ray radiation was used to illuminate different patterned structures (modulators), such as masks or diffusers, defining different transmission functions. This is illustrated in FIGS. 5A and 5B showing the two stages of the experiment and setups that are used for the experiment.

Figure 5A:
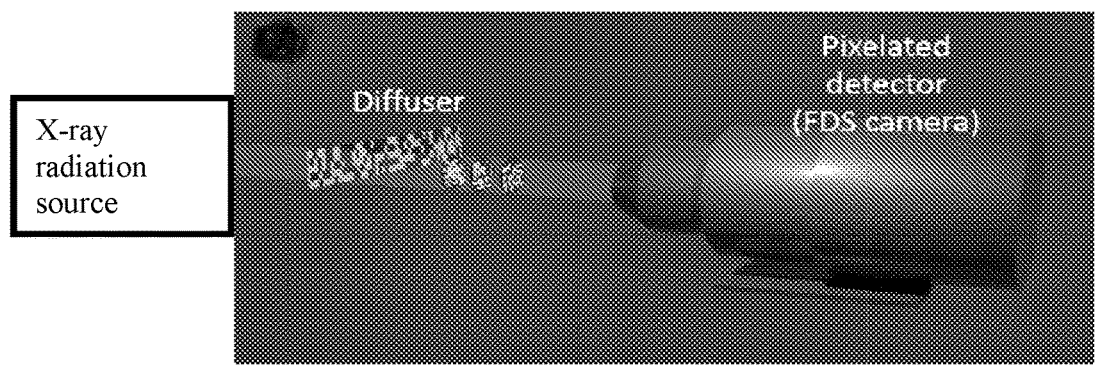
Figure 5B:
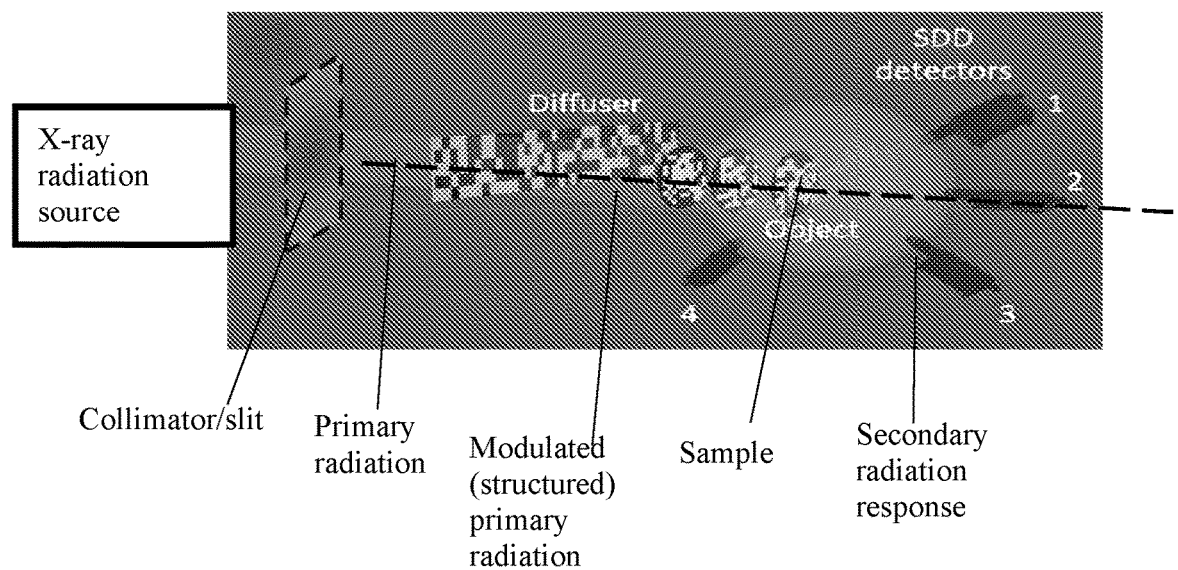

FIG. 5A shows a setup that is used for the first stage of the experiment including preliminary measurements of the spatial intensity patterns of the modulators (without the sample). The setup includes an X-ray radiation source, a diffuser, and a pixelated detector (FDS camera). The x-ray radiation source is a Rigaku 9W Cu rotating anode which generates Bremsstrahlung radiation centered at 15 Kev. Interaction of such primary x-ray radiation with the modulator (e.g. transmission through the modulator) encodes the primary radiation by the spatial intensity pattern of the modulator to form the encoded structured radiation. The modulator used in the experiment is a diffuser (sandpaper P320) with average feature size of about 40 microns, which is disposed 400 mm from the X-ray radiation source. The total beam size (cross-section of the beam) before using collimators/slits is about 8×1 mm².

The first stage is carried out in the absence of the sample and the intensity patterns of the mask are determined by raster scanning the mask and measuring the spatial intensity patterns of the structured radiation by a pixelated detector/FSD camera.

In the second stage, the sample (object) is added, which in this experiment is in the form of two partially overlapping thin films. This stage is illustrated in FIG. 5B. The diffusor is scanned again for the same positions/regions thereof as in the first stage. The secondary radiation response (fluorescence) from the sample is collected and measured by four photon-energy-resolving silicon drift detectors (SDDs) located at four different locations (different angular orientations) with respect to the sample.

The inventors conducted the experiment with and without a collimator/slit. When collimator is absent resulted in a relatively large spot (cross-section of the beam) of 8×1 mm$^2$, and an area of the beam which is relatively homogenous, is selected. The object is placed behind a pinhole (350-μm radius) that is used to determine the size of the image that is to be reconstructed. In this case it is difficult to measure the emitted-back radiation due to the noise caused by the large spot size. However, for the emitted-forward radiation, the pinhole significantly reduced this noise. The fluorescence was detected by the SDD (2) and by the SDD (3). In the case when the collimator is disposed between the radiation source and the sandpaper (diffuser), the spot was reduced to 1×1 mm$^2$ at full width half maximum (FWHM) enabling fluorescence measurements at the expense of the beam homogeneity. In this case, the fluorescence is detected and measured by SDD (1) located at about 45° degrees with respect to the radiation propagation axis above the axis and by SDD (4) located "below" the sample.

Figure 5C:
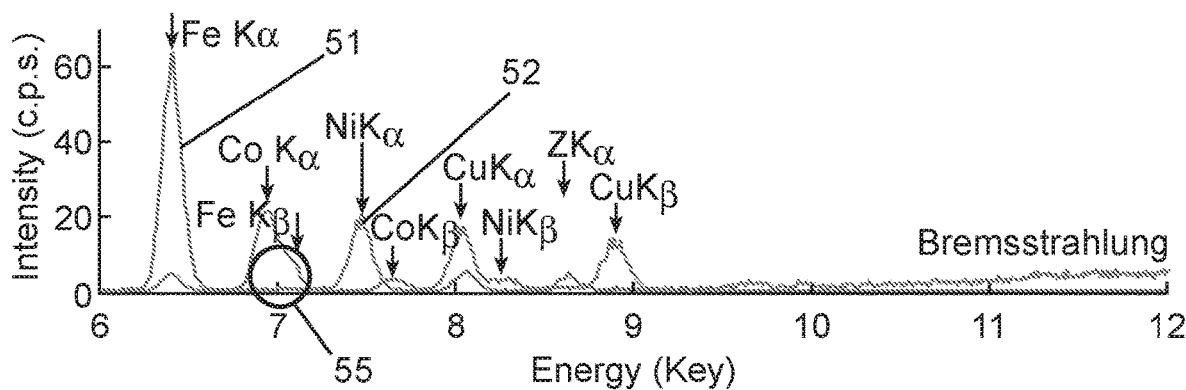
Figure 5D:
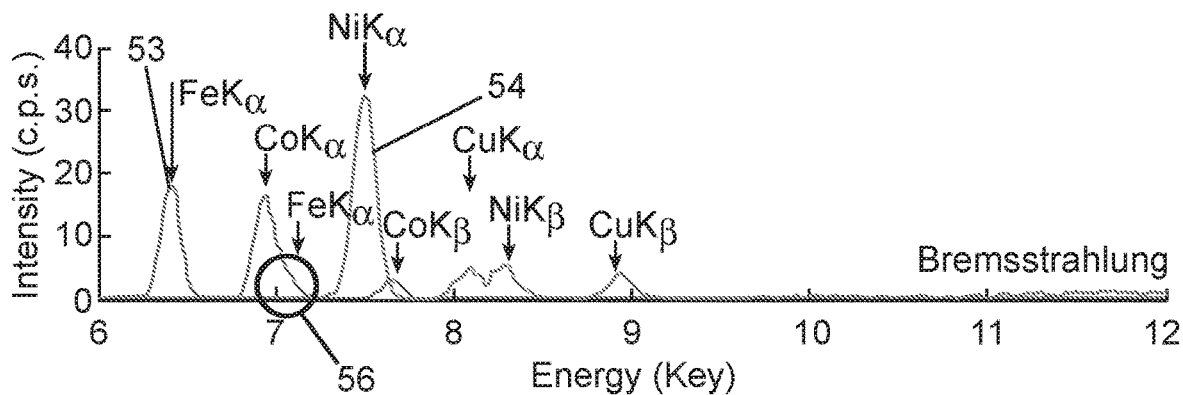

FIGS. 5C and 5D illustrate the results of processing of the measured spectral data including the detected intensities of different spectral components of the secondary radiation responses. The data processing includes generation of the correlation data, and compressed sensing processing thereof (using TVAL3 scheme). These figures show emission lines of the secondary response from the sample with and without the collimator, respectively. FIG. 5C shows fluorescence detected from the sample by SDD at position (3) represented by curve 51, and the primary x-ray radiation (various spectral components thereof) is represented by curve 52. FIG. 5D shows emission lines detected from the sample by SDD at position (4) represented by curve 53, and the primary x-ray radiation spectra is represented by curve 54.

The measured intensities for each emission line are then analyzed over the reference spectral data to associate them with the respective chemical elements (Co $K_\alpha$, Co $K_\beta$, Fe $K_\alpha$, Fe $K_\beta$) and reconstruct the image of chemical elements' spatial distribution. As can be seen in FIGS. 5C and 5D, there is some overlap between the Co $K_\alpha$ and the Fe $K_\beta$ emission lines (regions 55 and 56, respectively), thus only the pixels, which are outside this overlapping region, are selected for the image reconstruction.

Figures 5E, 5F, 5G:
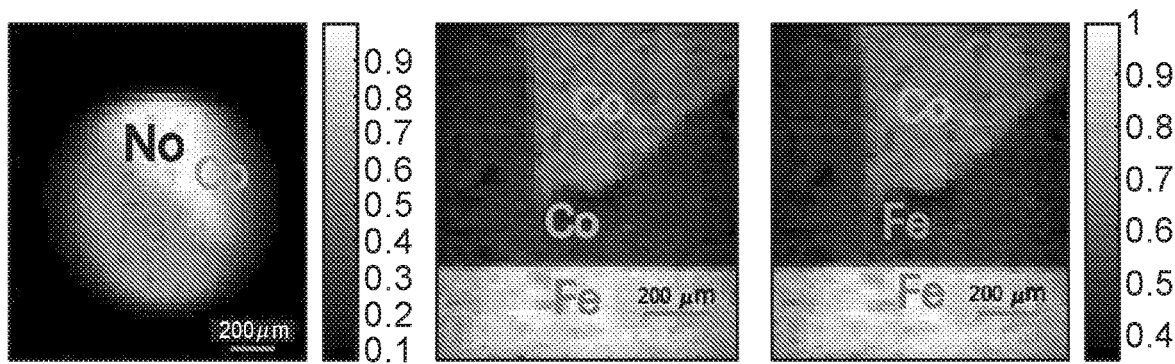

FIGS. 5E-5G show the reconstructed images of the sample with the spatial distribution of the chemical elements therein. FIG. 5E shows direct image of the sample placed on a zinc pinhole and obtained without the collimator. The label 'No' refers to a hole in the sample while 'Fe' and 'Co' refer, respectively, to regions including iron and cobalt. FIGS. 5F and 5G show images of opposite sides/layers of the sample when the two elements, iron (Fe) and cobalt (Co) placed on top of each other and in the presence of the collimator. FIG. 5F shows an image of the outer layer of the sample, i.e., the side that faces the SDDs (1), (2) and (3). Accordingly, this image is constructed mainly from "transmitted" fluorescence. FIG. 5G shows the inner layer of the sample i.e., the side that faces the diffuser. This image is contracted from "reflected" fluorescence. Since the sample was not thin and due to self-absorption of the secondary emission generated inside the sample the main contribution to the detected fluorescence was generated at the samples near its surface and the reconstruction should have been different between the transmission and reflection geometries as presented in FIGS. 5F and 5G.

FIGS. 5H-5K show the experimental results of reconstructed images of the sample (chemical element maps) from the spectral measured data detected by various detectors SDDs (1)-(4). The regions/areas $R_1$ and $R_2$ correspond to the cobalt (Co) and iron (Fe) emission lines, respectively. Regions/areas $R_3$ correspond to a mixture of both elements. FIGS. 5H and 5I show reconstructed images obtained without the collimator based on fluorescence detected by SDDs (2) and (3), respectively; and FIGS. 5J and 5K show reconstructed images obtained with the collimator based on fluorescence detected by SDDs (1) and (4), respectively.

As can be seen in FIGS. 5H-5K, the different regions/areas of the cobalt (Co) and iron (Fe) are clearly visible. However, there is some blurring in the reconstructed images. The relatively high-quality image of the cobalt foil and relatively lower-quality image of the iron (Fe) foil indicates that beam or some portion of scattered radiation interacts with other objects made of iron. These objects typically generate fluorescence at the same photon energy and therefore produce noise.

The inventors have conducted another experiment based on the same two-step approach described above with reference to FIGS. 5A and 5B. These experiments are illustrated in FIGS. 6A-6J showing the setups used in the experiment and experimental results.

Figure 6A:
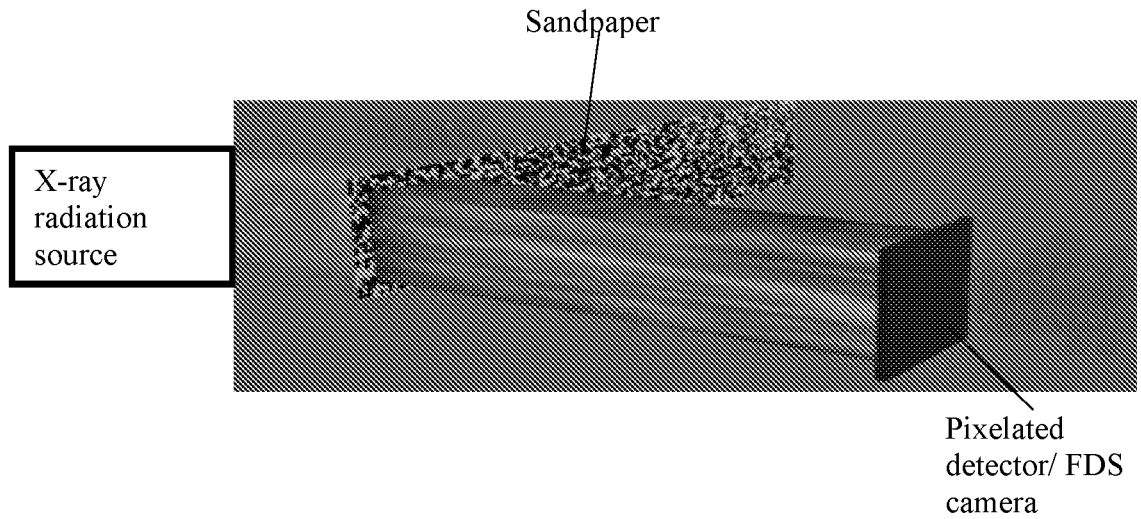

FIG. 6A shows the setup of the first stage. The mask (sandpaper) is scanned, while moving/shifting with respect to the x-ray propagation path at step size that is equal to the beam size which is 1.5×1.5 mm$^2$ (determined by the collimator(s)). This movement shift of the sandpaper results in bringing a different patterned region thereof to interaction with the x-ray radiation. The spatial intensity patterns (modulation encoding data) of the different regions of sandpaper are measured (while scanning) by the pixelated detector where the pixel size is 4.5 μm and the resolution is about 13 μm. The primary radiation source used is a rotating copper anode and the mask is a sandpaper with an average feature size of about 40 μm. The spectrum of the input beam includes mainly the characteristic spectrum for excitation of copper emission lines at 8048 and 8900 eV, and the Bremsstrahlung x-ray radiation is about 15 keV.

Figure 6B:
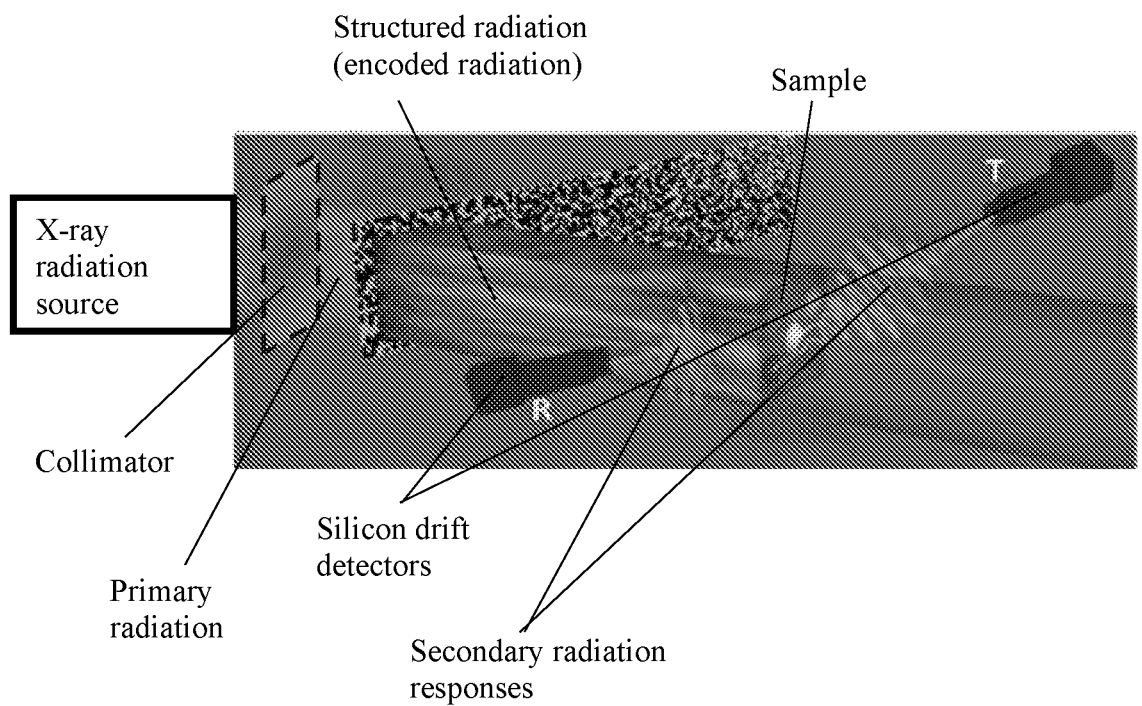

FIG. 6B shows the setup of the second stage. The pixelated detector is removed, a sample which includes three small objects made from iron (Fe), cobalt (Co), and brass ($Cu_3Zn_2$) is inserted, and the x-ray fluorescence (secondary radiation response of the sample) is detected and measured by two photon-energy-resolving silicon drift detectors (SDDs) located at two different positions: upstream the sample denoted as position R and downstream the sample dented as position T. The sandpaper is scanned again (while moving with respect to the x-ray radiation propagation path) at the same positions as the first stage and fluorescence spectral data (intensity) is detected/measured by the SDDs.

Figure 6C:
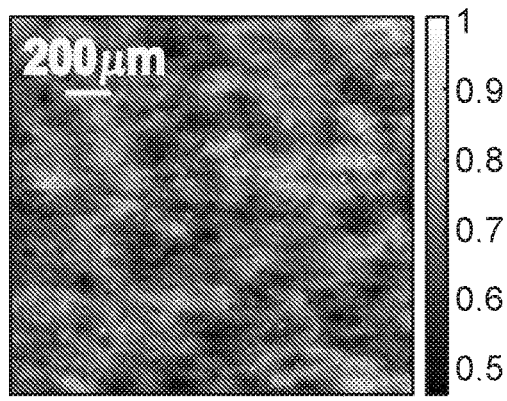

FIG. 6C shows the modulation encoding data obtained in the first step, i.e., the spatial intensity pattern induced by the region of the sandpaper.

Figure 6D:
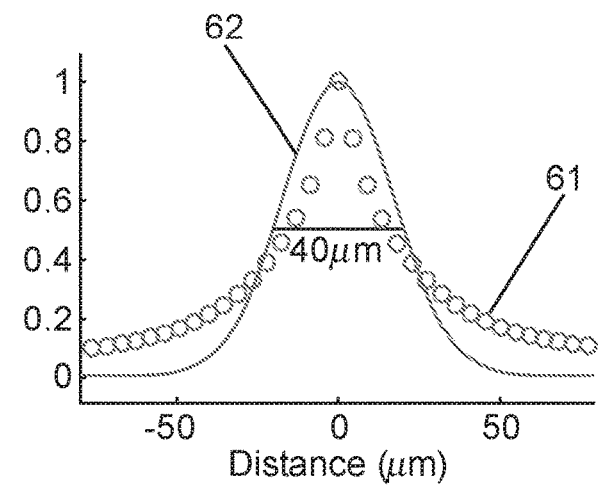

FIG. 6D shows the vertical cross section of the autocorrelation of the intensity pattern induced by the patterned region of the sandpaper averaged over all realizations, i.e., a sequence of different regions on the sandpaper encoding the primary radiation by respective different radiation transmission functions. Dots forming a curve 61 represent the measured data pieces and curve 62 (continuous curve) represents a Gaussian fitting function. As can be seen, the autocorrelation function is nearly isotropic, and the inventors have found that the full width at half maximum (FWHM) of the curve 62 is 40±7 µm and is in agreement with the average feature size of the mask (sandpaper).

Figure 6E:
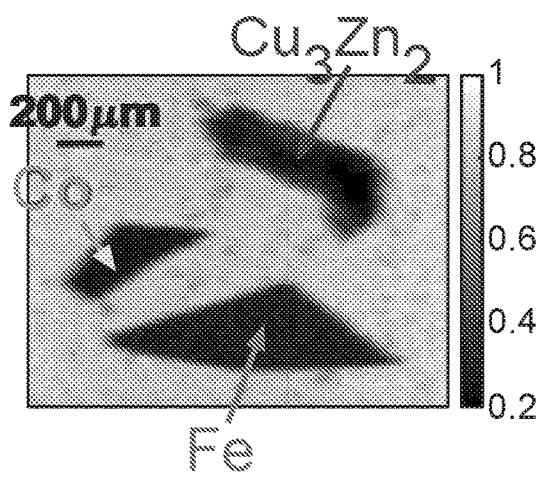
Figure 6F:
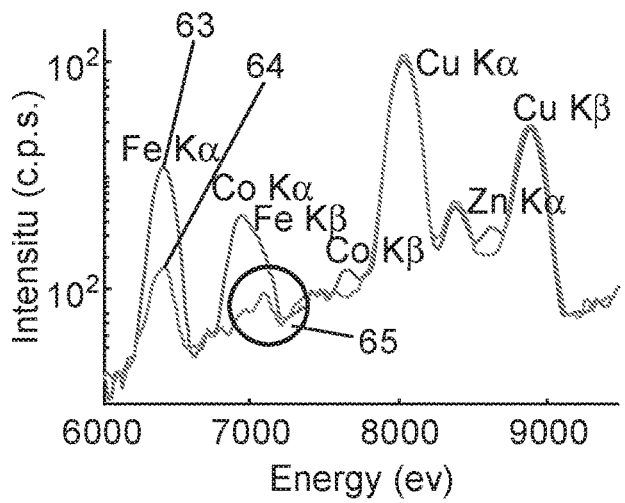
Figure 6G:
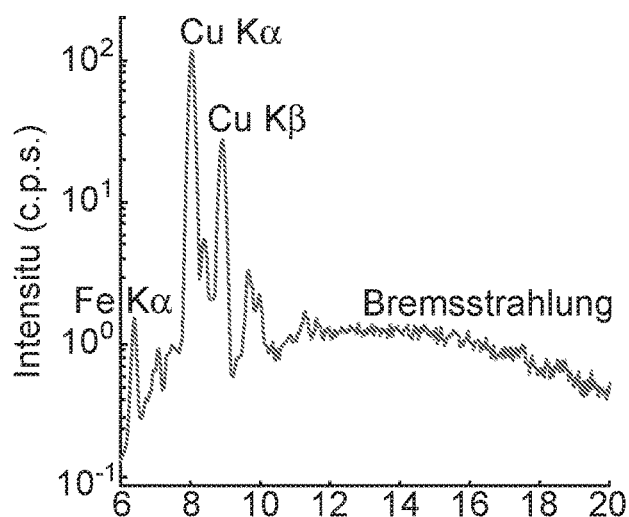

FIGS. 6E and 6F show, respectively, a normalized transmission image and a fluorescence spectrum of the sample which includes iron (Fe), cobalt (Co), and brass ($Cu_3Zn_2$) elements. In FIG. 6F, curve 64 represents the spectrum in the absence of the sample, and curve 63 represents the spectrum when the sample is present (i.e., including emission lines corresponding to the secondary radiation responses of the sample). The emission lines of the chemical elements are indicted near the spectral peaks. FIG. 6G shows the whole spectrum of the input beam (primary radiation), from which the curve 64 is obtained.

For the measurement of the single pixel detector data that corresponds to iron, the intensity is integrated over each of the peaks of the Fe $K_\alpha$, $K_\beta$ emission lines, and for the data that correspond to the cobalt the intensity is integrated over each of peaks of the Co $K_\alpha$, $K_\beta$ emission lines.

As shown in FIG. 6F there is some overlap between the Co $K_\alpha$ and the Fe $K_\beta$ emission lines (region 65), thus only the spectral ranges which are outside this overlapping region 65 are selected for the reconstruction of the chemical element map.

As can be seen from the figures, the background sources in the experiment are iron fluorescence from components such as holders and slits of the x-ray source. To suppress the strong background noise from the iron containing materials that are not part of the sample, the emission spectra is measured for all the N realizations (different patterned regions on the encoding mask) in the absence of the sample (as curve 64) and subtracted from the corresponding spectra that is measured in the second step of the experiment, i.e., with the sample (as curve 63).

The brass object contains copper and zinc with emission lines for which the photon energy resolution of the SDDs is insufficient to distinct them from the characteristic emission lines of our source as can be clearly seen in FIG. 6F. While for this reason reconstruction of the image of the Brass object is difficult, it is clearly seen that the present invention can be used for the elimination of strong background noise and the images of the iron and cobalt objects are very clear despite the strong background (the copper emission lines are stronger than the emission lines of the iron and the cobalt by about a factor of 7).

FIGS. 6H and 6I show reconstructed chemical element maps using fluorescence measured by the SDDs at position R and T, respectively. Regions/areas $R_1$ and $R_2$ indicate locations in the sample containing the iron and cobalt elements respectively.

Figure 6J:
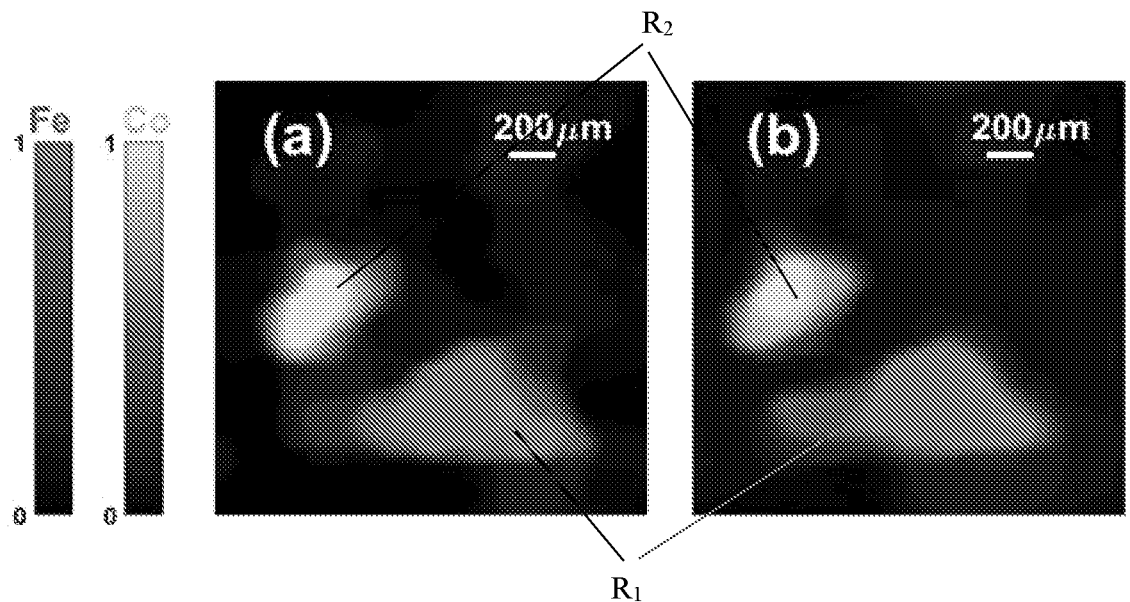
Figure 6J:
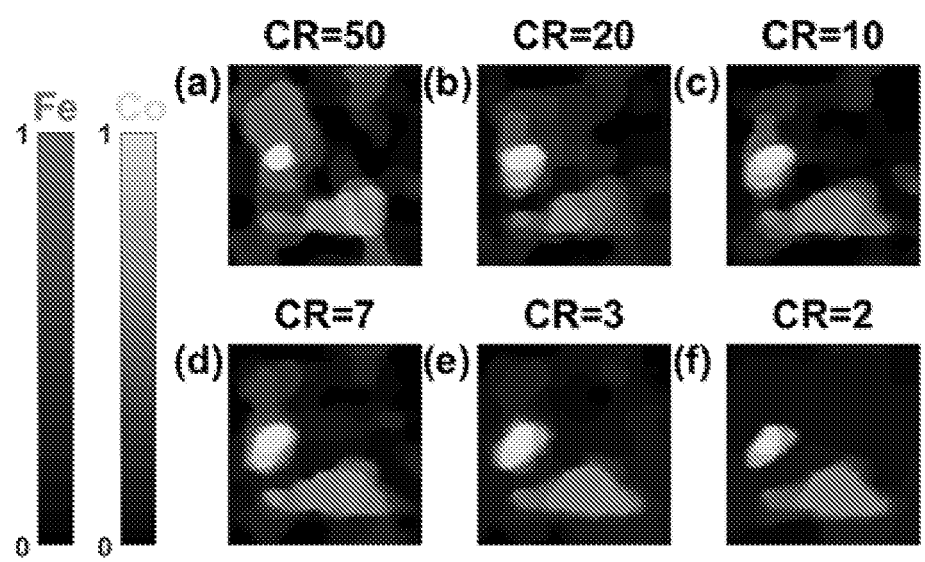

FIG. 6J shows chemical element map reconstructed based on fluorescence measured by SDD at the detector position T for compression ratios (CRs) (a) to (f) being, respectively: CR=50, CR=20, CR=10, CR=7, CR=3, and CR=2. The compression ratios are defined by the number of pixels in the map divided by the number of realizations (modulation encoding patterns) utilized in the measurements. The maps shown in FIG. 6J include 1010 pixels, which correspond to the number of sampling points in standard micro-XRF.

The compression ratio can be indicative of the reduction of the measurement time that can be provided by the technique of the present invention. The present invention can provide high-resolution image even after 144 realizations, which corresponds to a compression ratio of 7 and identify the objects even with a compression ratio of 20.

Thus, the inventors have shown that the chemical maps can be measured in much shorter times compared to standard micro-XRF methods since the number of realizations (encodings) used with the present invention is significantly smaller than the number of sampling points with standard XRF methods.

It should be noted that the measurement time reduction shown herein is due to the reduction of the scanning points. Therefore, the present invention can be beneficial when the measurement duration is limited by the speed of the motor that is used for the scanning of the diffuser/mask. Furthermore, since the compressed sensing scheme uses a priori knowledge of the encoding patterns, the total exposure time is further reduced.

Generally, the resolution of the reconstructed image (chemical map) is determined by the correlation width of the encoding pattern (mask). The correlation width at an arbitrary point (u, v) on the mask for each realization (encoding) can be calculated by using autocorrelation function:

$$C_i(u,v) = \frac{\sum_{x,y}(I_i(x,y) - \overline{I}_i)(I_i(x-u, y-v), -\overline{I}_i)}{\sqrt{\sum_{x,y}(I_i(x,y) - \overline{I}_i)(I_i(x-u, y-v), -\overline{I}_i)^2}}$$

For each i-th realization, $I_i(x,y)$ is the intensity at row x and column y, and $\overline{I}_i$ is the average intensity. Then, the matrix C is averaged over all the realizations.

Figure 7:
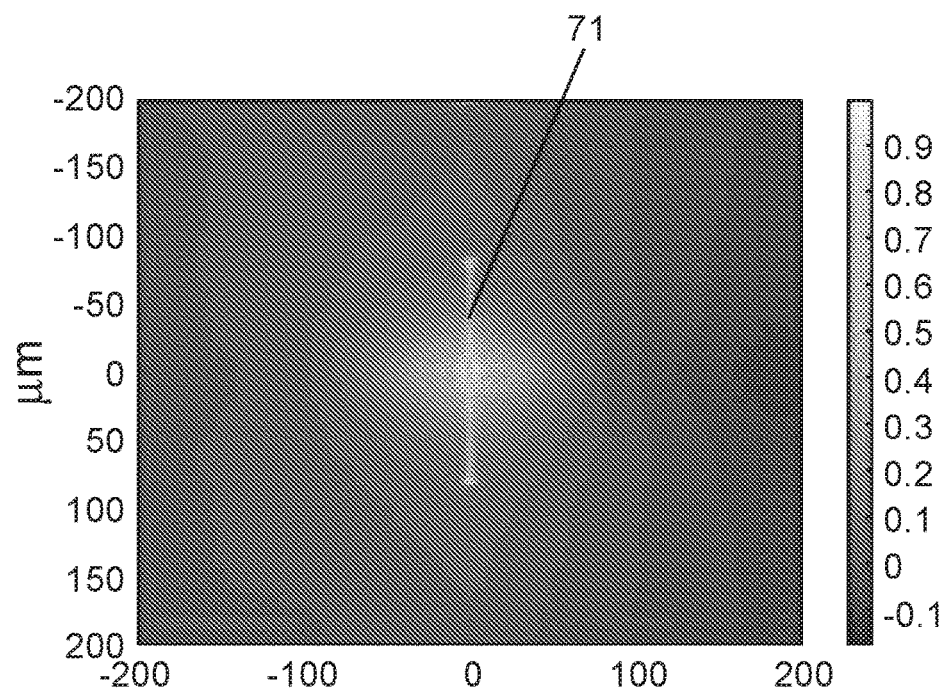
FIG. 7 exemplifies average autocorrelation matrix.

In this connection reference is made to FIG. 7 showing the average autocorrelation matrix (the average is over the N realizations). Line 71 corresponds to the vertical cross-section of the autocorrelation function shown in FIG. 6D. It should be noted that while this specific procedure is used to calculate the correlation of the speckle pattern image in the vertical direction, comparable results are obtained for the horizontal direction or for any other direction as well.

Thus, the inventors have shown that resolution of the invention is significantly better than the shortest distance between the iron and cobalt objects in the sample, which is about 150 microns. This is in accordance with theoretical resolution, which is determined by the width of the autocorrelation function of the mask as described above and in contrast to standard micro-XRF for which the spatial resolution is determined by the spot size of the input beam, thus limited by the focusing capabilities of the system. The resolution demonstrated herein is about 40 µm while the spot size that is used is about 1.5 mm (determined by the collimators). The invention can thus be used for high-resolution chemical maps at resolutions that are not limited by the focusing capabilities of the system.

Resolution obtained by the technique of the invention can be further improved by using masks/collimators with smaller features. It should be noted that masks/diffusers that are fabricated by photolithography or by electroplating can be used with the present invention for reconstructions of images with resolutions below 10 inn. It is also possible to use masks fabricated with sub-micron features using nanotechnology techniques like e-beam lithography and x-ray photolithography. Since the feature size of the encoding spatial pattern affects/controls the resolution of reconstructed image, the technique of the present invention provides for sub-micron resolution XRF with tabletop sources.

An additional advantage of the present invention, which supports the improvement of the resolution, is the relaxed sensitivity to beam and sample drifts. While for raster scanning, drifts on the order of the spot size of the input beam directly deteriorate the resolution, with the technique of the present invention, drift effects are mitigated since the irradiated area is significantly larger and includes a large number of intensity fluctuations.

It should also be noted that when operating with x-ray radiation, while the lateral size of the features of the mask determines the resolution as described above, the thickness of the features determines the magnitude of the intensity fluctuations/patterns, and hence impacts/affects the quality of the image.

To demonstrate the dependence of the image quality on the contrast of the intensity fluctuations the inventors simulated the experiment and calculated the PSNR (peak signal-to-noise ratio) of the reconstructed image as a function of the contrast for various compression ratio values. The PSNR is calculated according to:

$$PSNR = 10 \log\left(\frac{peakval^2}{MSE}\right)$$

where 'peakval' is the maximum possible pixel value of the image and MSE is the mean square error between the reconstructed image and the original image. The joint PSNR of the Cobalt and the Iron images is calculated as the average between the PSNR values of the images.

In order to represent the contrast effect, the fluctuation-to-noise ratio (FNR) is defined as:

$$FNR = \frac{std(s)}{\langle\sqrt{s}\rangle}$$

where 's' is the set of the intensities detected at the specific emission lines for all realizations.

Thus, the FNR represents the ratio between the measured fluctuations and the shot noise. FNR values, which are larger than one, correspond to intensity fluctuations that are stronger than the shot noise. To obtain the value of the two elements, the two FNRs are averaged. This parameter is used since it includes the normalization by the shot noise, which is one of the most prominent sources for background noise in XRF. It should be noted that in the absence of noise, the contrast can be arbitrary small (but larger than zero). For the parameters of the experiment, the value of the FNR is about 3.5 and the PSNR is about 20 for the compression ratio of 2 (corresponding to the image shown in FIG. 6I).

Figure 8:
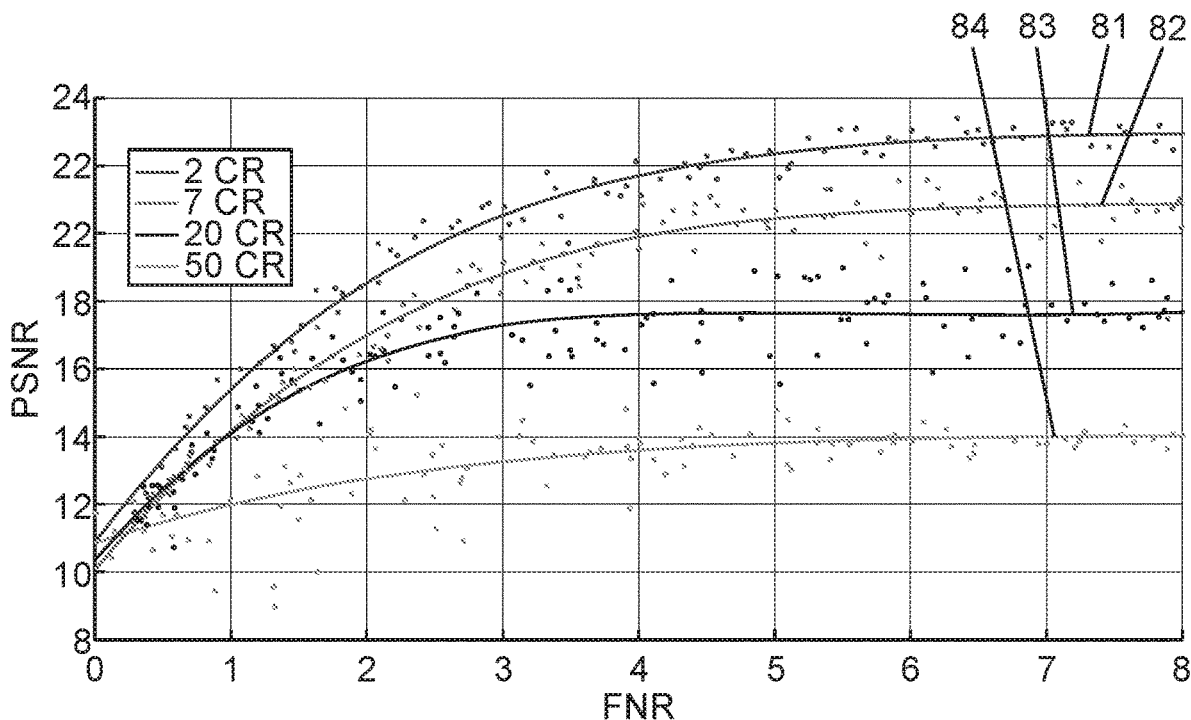
FIG. 8 shows PSNR as function of FNR for various values of compression ratios (CRs).

Reference is made to FIG. 8 showing the PSNR as function of the FNR for various values of compression ratios (CRs). Solid curves 81, 82, 93, and 84 are fitting curves that correspond to CR values of 2, 7, 20, and 50. As can be seen in the figure, with FNRs below 1, the PSNR is very small. These values indicate that no clear image is reconstructed for FNR values below 1. As the FNR increases, the image quality improves until the value of about 4. At higher values of the FNR the image quality is nearly independent of the FNR. With higher FNRs, higher values of compression ratio can be used. For example, to achieve a PSNR of 20 with an FNR of 2.5, a CR of 2 can be used, while with an FNR of 4.5 even a CR of 7 might be sufficient. It should be noted that for very high CR values, the PSNR is low for any values of the FNR.

The invention claimed is:

1. A measurement system for determining spatial distribution of chemical elements in a sample, the system comprising:

a measurement unit comprising: a primary radiation generator configured and operable to produce primary radiation, comprising x-ray and/or gamma-ray spectral ranges, having spectral characteristic adapted to excite a number $M(M\geq 1)$ of chemical elements in the sample to induce M respective secondary radiation responses, respectively, from the sample; and a detection unit configured and operable to generate spectral measured data indicative of intensity of detected radiation; wherein said primary radiation is in the form of a sequence of two or more encoded radiation patterns of the primary radiation, each of said two or more encoded radiation patterns having its predetermined spatial intensity pattern of the primary radiation, such that the measured data is in the form of a sequence of measured spectral data pieces comprising two or more measured spectral data pieces indicative of two or more secondary radiation responses from the sample, each being modulated by the respective one of the two or more predetermined spatial intensity patterns of the encoded primary radiation and characterized by sparsity in spectral domain with respect to each spectral component of the secondary radiation response; and a control system comprising a data processor configured and operable for receiving and analyzing the measured data and determining data indicative of spatial distribution of said M chemical elements in the sample, said analyzing of the measured spectral data comprising: utilizing modulation encoding data indicative of said sequence of the predetermined spatial intensity pattern of the primary radiation used in measurements of the sample and applying compressed sensing processing to the measured spectral data to determine correlation data describing correlation between each of the spectral measured data pieces and the respective predetermined spatial intensity pattern of the encoded primary radiation, and extract, from the correlation data, location data where each spectral component of the detected secondary responses is originated in the sample, and utilizing reference spectral data indicative of secondary radiation responses of the predetermined M chemical elements and associating the location data of origination of the spectral components of the detected secondary responses with the respective M chemical elements and reconstructing map data indicative of spatial distribution of each of the M chemical elements in the sample.

2. The measurement system according to claim 1, wherein the primary radiation generator comprises a source of the primary radiation having said spectral characteristic, and a modulation device accommodated in a path of said primary radiation propagating towards the sample, said modulation device being configured and operable to successively encode said primary radiation by two or more different radiation transmission functions thereby producing said sequence of the two or more encoded radiation patterns of the primary radiation each characterized by the corresponding predetermined spatial intensity pattern of the primary radiation.

3. The measurement system according to claim 2, wherein said modulation device defines a set of two or more spatial modulators, each having a different pattern of features defining the respective radiation transmission function, said modulation device being configured and operable to sequentially accommodate each one of the two or more of the spatial modulators in said path of the primary radiation propagation to the sample.

4. The measurement system according to claim 3, wherein said modulation device is configured as a patterned element having an array of two or more spaced-apart differently patterned regions, forming said two or more modulators, respectively, said modulation device being configured and operable to be displaceable with respect to said path of the primary radiation propagation to the sample to thereby sequentially accommodate each one of said two or more differently patterned regions in said path.

5. The measurement system according to claim 3, wherein the spatial modulators are are configured as a diffuser or mask modulating the primary radiation to produce structure radiation characterized by the predetermined spatial intensity pattern of the primary radiation.

6. The measurement system according to claim 1, wherein said data processor is configured and operable to obtain, from a data storage utility, pre-stored data indicative of the sequence of said two or more predetermined spatial intensity patterns of the primary radiation measured by said detection unit and utilize said pre-stored data in association with the sequence of the two or more measured spectral data pieces in said compressed sensing processing to determine the location data.

7. The measurement system according to claim 1, wherein said detection unit comprises at least one pixelated detector.

8. The measurement system according to claim 1, wherein said detection unit comprises one or more single-pixel detector.

9. The measurement system according to claim 7, being configured and operable to perform preliminary measurements to determine data indicative of the sequence of said two or more predetermined characteristic spatial intensity patterns of the primary radiation measured by said at least one pixelated detector, and associate said sequence of the two or more predetermined spatial intensity patterns of the primary radiation measured by said at least one pixelated detector with the respective sequence of the measured spectral data pieces of the secondary radiation responses of the sample.

10. The measurement system according to claim 1, wherein said reference data are pre-stored in a storage utility of the control system.

11. The measurement system according to claim 1, wherein the control system is configured and operable for data communication with an external database to access said reference data stored in said database.

12. A method for determining spatial distribution of chemical elements in a sample, the method comprising:
providing predetermined modulation encoding data comprising two or more predetermined spatial intensity patterns of primary radiation, comprising x-ray spectral ranges, each corresponding to the primary radiation encoded by respective two or more different spatial transmission functions;
performing a plurality of spectral measurements on the sample including a sequence of two or more spectral measurements comprising: exciting the sample with said primary radiation encoded by said two or more different spatial transmission functions, respectively, and having spectral characteristic adapted to excite a number M(M≥1) of chemical elements in the sample to induce M respective secondary radiation responses, respectively, from the sample, detecting the secondary radiation responses and generating spectral measured data comprising two or more measured spectral data pieces indicative of two or more secondary radiation responses from the sample, each being characterized by sparsity in spectral domain with respect to each spectral component of the secondary radiation response and being modulated by the respective one of the two or more predetermined characteristic spatial intensity patterns of the encoded primary radiation; and
analyzing the spectral measured data and determining data indicative of spatial distribution of said M chemical elements in the sample, said analyzing of the measured spectral data comprising: utilizing the modulation encoding data indicative of said sequence of the two or more predetermined spatial intensity patterns used in measurements on the sample and applying compressed sensing processing to the spectral measured data to determine correlation data describing correlation between each of the spectral measured data pieces and the respective predetermined spatial intensity pattern of the encoded primary radiation, and extract, from the correlation data, location data where each spectral component of the detected secondary responses is originated in the sample, and utilizing reference spectral data indicative of secondary radiation responses of the M chemical elements associating the location data of origination of the spectral components of the detected secondary responses with the respective M chemical elements, and reconstructing map data indicative of spatial distribution of each of the M chemical elements in the sample.

13. The method according to claim 12, wherein said providing of the modulation encoding data comprises: generating the primary radiation having said spectral characteristic; encoding the primary radiation by sequentially applying to the primary radiation a sequence of the two or more different radiation transmission functions; detecting the corresponding spatial intensity patterns of the encoded primary radiation; and generating the modulation encoding data indicative thereof.

14. The method according to claim 13, wherein said encoding of the primary radiation comprises sequentially interacting the primary radiation with a set of two or more spatial modulators, each having a different pattern of features defining the respective radiation transmission function.

15. The method according to claim 13, comprising storing the modulation encoding data in a storage device.

16. The method according to claim 14, wherein the spatial modulators are configured as a diffuser or mask modulating the primary radiation.

17. The method according to claim 12, comprising communicating with an external database to access said spectral reference data stored in said database.

18. A control system for use in determining spatial distribution of chemical elements in a sample, the control system comprising a computer system comprising data input and output interface, a memory utility, and a data processor, and being in data communication with a measurement system providing measured data comprising two or more measured spectral data pieces indicative of two or more detected secondary radiation responses of a sample modulated by respective two or more predetermined spatial intensity patterns of encoded primary radiation of x-ray and/or gamma-ray spectral ranges and characterized by sparsity in spectral domain with respect to each spectral component of the secondary radiation response, the data processor being configured and operable to receive and analyze said measured data and determine spatial distribution of M chemical elements in the sample, the analysis of the measured data comprising:

utilizing modulation encoding data indicative of the predetermined spatial intensity pattern of the primary radiation and applying compressed sensing processing to the measured spectral data to determine correlation data describing correlation between each of the spectral measured data pieces and the respective predetermined spatial intensity pattern of the encoded primary radiation, and extract, from the correlation data, location data where each spectral component of the detected secondary responses is originated in the sample, and utilizing reference spectral data indicative of secondary radiation responses of the predetermined M chemical elements and associating the location data of origination of the spectral components of the detected secondary responses with the respective M chemical elements, and reconstructing map data indicative of spatial distribution of each of the M chemical elements in the sample.

* * * * *